(12) United States Patent
Kim

(10) Patent No.: US 11,356,741 B2
(45) Date of Patent: Jun. 7, 2022

(54) IMAGE DISPLAY APPARATUS AND METHOD FOR OPERATING SAME

(71) Applicant: SAMSUNG ELECTRONICS CO., LTD., Suwon-si (KR)

(72) Inventor: Pyoungyun Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/980,515

(22) PCT Filed: Mar. 19, 2019

(86) PCT No.: PCT/KR2019/003174
§ 371 (c)(1),
(2) Date: Sep. 14, 2020

(87) PCT Pub. No.: WO2019/182323
PCT Pub. Date: Sep. 26, 2019

(65) Prior Publication Data
US 2021/0021904 A1    Jan. 21, 2021

(30) Foreign Application Priority Data

Mar. 19, 2018 (KR) .................. 10-2018-0031708

(51) Int. Cl.
*H04N 21/485* (2011.01)
*H04N 21/422* (2011.01)
*H04N 21/4363* (2011.01)

(52) U.S. Cl.
CPC ..... *H04N 21/485* (2013.01); *H04N 21/42204* (2013.01); *H04N 21/43635* (2013.01)

(58) Field of Classification Search
CPC ....... H04N 21/43635; H04N 21/43615; H04N 21/43637; H04N 5/765; H04N 5/775;
(Continued)

(56) References Cited

U.S. PATENT DOCUMENTS

| 8,094,989 B2 | 1/2012 | Kim |
| 8,395,705 B2 | 3/2013 | Lee |

(Continued)

FOREIGN PATENT DOCUMENTS

| KR | 10-2006-0011534 | 2/2006 |
| KR | 10-1196432 | 11/2012 |

OTHER PUBLICATIONS

International Search Report dated Jul. 8, 2019 in International Application No. PCT/KR2019/003174 and English-language translation.

(Continued)

*Primary Examiner* — Samira Monshi
(74) *Attorney, Agent, or Firm* — Nixon & Vanderhye, P.C.

(57) ABSTRACT

An image display apparatus and an operating method thereof are provided. The image display apparatus may be connected to an image processing device and include a memory storing one or more instructions, and a processor configured to execute the one or more instructions stored in the memory to: create a table including physical address information of each of at least one source device connected to the image processing device and device identification information corresponding to the physical address information; display a user interface including the device identification information included in the table; and change to an input mode of a source device corresponding to device identification information selected in response to a user input to select device identification information, based on the physical address information corresponding to the selected device identification information.

13 Claims, 13 Drawing Sheets

(58) Field of Classification Search
CPC ...... H04N 21/437; H04N 5/268; H04N 19/00;
H04N 21/4104; H04N 21/4122
See application file for complete search history.

(56) References Cited

U.S. PATENT DOCUMENTS

| | | |
|---|---|---|
| 2007/0153132 A1 | 7/2007 | Jong |
| 2008/0247544 A1 | 10/2008 | Candelore et al. |
| 2009/0141180 A1* | 6/2009 | Kondo ............. H04N 21/42204 |
| | | 348/723 |
| 2009/0237571 A1 | 9/2009 | Horimoto et al. |
| 2010/0013998 A1 | 1/2010 | Mortensen |
| 2012/0249890 A1 | 10/2012 | Chardon et al. |
| 2013/0057774 A1* | 3/2013 | Yoshida ........... H04N 21/41407 |
| | | 348/725 |
| 2013/0229579 A1 | 9/2013 | Jiang |
| 2014/0313420 A1 | 10/2014 | Kim et al. |
| 2017/0026606 A1 | 1/2017 | Kim et al. |
| 2017/0048577 A1 | 2/2017 | Chiou et al. |

OTHER PUBLICATIONS

Written Opinion dated Jul. 8, 2019 in International Application No. PCT/KR2019/003174 and English-language translation.
Extended Search Report dated Dec. 2, 2020 in counterpart European Patent Application No. 19771230.0.

\* cited by examiner

FIG. 6

| PHYSICAL ADDRESS INFORMATION OF SOURCE DEVICE | DEVICE IDENTIFICATION INFORMATION OF SOURCE DEVICE ||
|---|---|---|
| | DEVICE TYPE | DEVICE MANUFACTURER |
| <2.1.0.0> | BD PLAYER | COMPANY A |
| <2.2.0.0> | SET-TOP BOX | COMPANY B |
| <2.3.0.0> | OTT BOX | COMPANY C |

# IMAGE DISPLAY APPARATUS AND METHOD FOR OPERATING SAME

This application is the U.S. national phase of International Application No. PCT/KR2019/003174 filed Mar. 19, 2019 which designated the U.S. and claims priority to KR Patent Application No. 10-2018-0031708 filed Mar. 19, 2018, the entire contents of each of which are hereby incorporated by reference.

TECHNICAL FIELD

Various embodiments of the disclosure relate to an image display apparatus and an operating method thereof, and more particularly, to an image display apparatus capable of automatically setting an external input source and an operating method thereof.

BACKGROUND ART

A display apparatus is an apparatus having a function of displaying an image that a user can watch. A user can watch a broadcast on the display apparatus. The display apparatus displays a broadcast selected by the user from among broadcast signals transmitted from a broadcasting station on a display. Nowadays, broadcasting has shifted from analog broadcasting to digital broadcasting worldwide.

Digital broadcasting refers to broadcasting for transmission of digital video and audio signals. Digital broadcasting is more resistant to external noise than analog broadcasting, and thus, has reduced data loss rate, which is advantageous in terms of error correction, high resolution, and display of clear images. Digital broadcasting can also provide interactive services unlike analog broadcasting.

Smart TVs having a digital broadcasting function and capable of providing various types of content have been developed. Rather than being operated manually according to a user's selection, smart TVs are intended to analyze content that a user wants and provide the content to the user without user's intervention.

In addition, in order to view content by connecting a set-top box or the like to a display apparatus, it is necessary to set the set-top box or the like in advance as an external input source for the display apparatus and change an input mode of the display apparatus to the external input source. Accordingly, there is a need to develop a method of setting an external input source more conveniently.

SUMMARY

The disclosure provides an image display apparatus capable of automatically setting an external input source and an operating method thereof.

Technical aspects of the disclosure are not limited thereto, and other technical aspects not mentioned here will be clearly understood by those of ordinary knowledge in the technical field to which the disclosure pertains from the following description.

According to an aspect of the disclosure, an image display apparatus connected to an image processing device includes a memory storing one or more instructions, and a processor configured to execute the one or more instructions stored in the memory to: create a table including physical address information of each of at least one source device connected to the image processing device and device identification information corresponding to the physical address information; display a user interface including the device identification information included in the table; and change to an input mode of a source device corresponding to device identification information selected in response to a user input to select device identification information, based on the physical address information corresponding to the selected device identification information.

According to another aspect of the disclosure, an operating method of an image display apparatus connected to an image processing device includes creating a table including physical address information of each of at least one source device connected to the image processing device and device identification information corresponding to the physical address information; displaying a user interface including the device identification information included in the table; and changing to an input mode of a source device corresponding to device identification information selected in response to a user input to select device identification information, based on the physical address information corresponding to the selected device identification information.

According to another aspect of the disclosure, a non-transitory computer-readable recording medium storing a program for executing the operating method in a computer is provided.

BRIEF DESCRIPTION OF DRAWINGS

FIG. 6 is a diagram for explaining an example of creating a table according to an embodiment of the disclosure.

DETAILED DESCRIPTION

Figure 1:
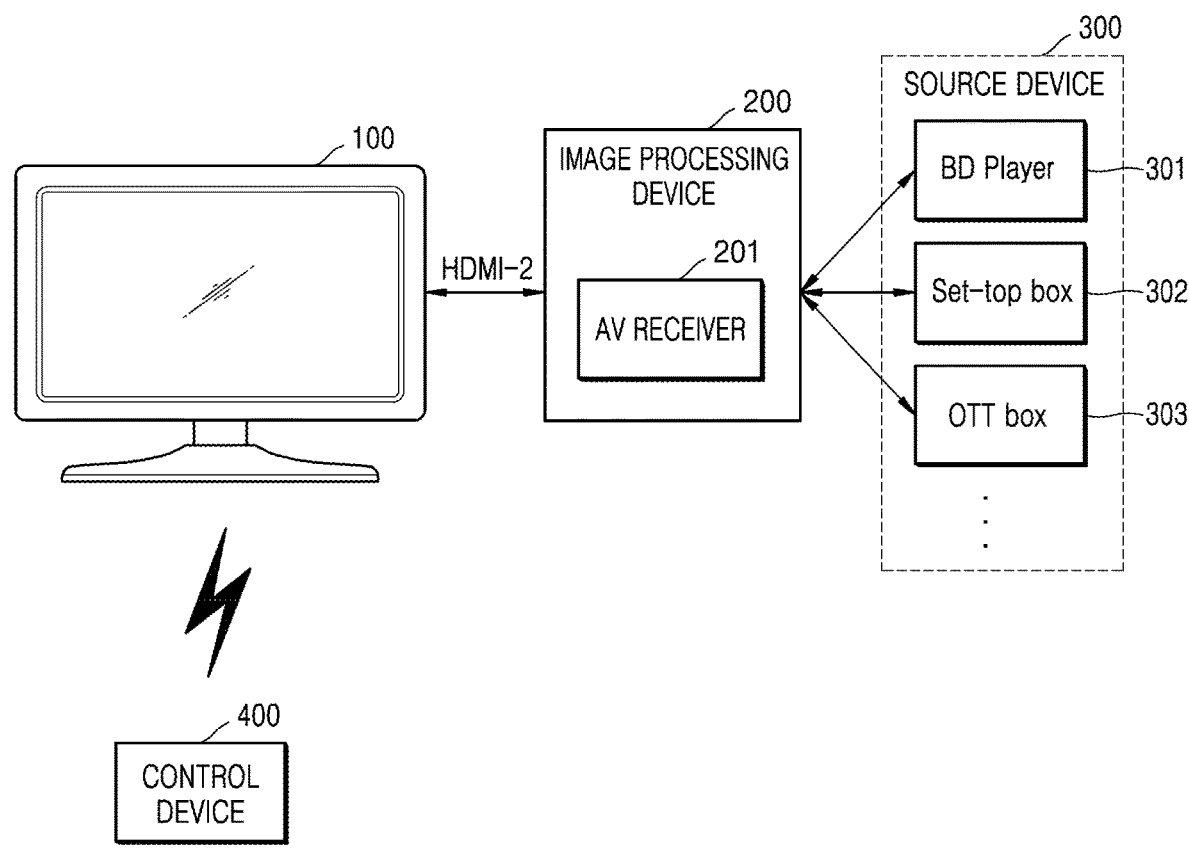
FIG. 1 is a schematic diagram of a system according to an embodiment of the disclosure.

Hereinafter, embodiments of the disclosure will be described in detail with reference to the accompanying drawings, so that these embodiments of the disclosure may be easily implemented by those of ordinary skill in the art.

However, the disclosure may be embodied in many different forms and is not limited to the embodiments of the disclosure set forth herein. For clarity, parts not related to explaining the disclosure are omitted in the drawings, and like components are denoted by like reference numerals throughout the specification.

In the disclosure, general terms that have been widely used nowadays are selected in consideration of functions mentioned herein but various other terms may be used according to the intentions of technicians in the this art, precedents, new technologies, or the like. Accordingly, the terms used herein should be defined not based on the names thereof but based on the meanings thereof and the whole context of the disclosure.

Terms such as first and second may be used to describe various components, but the components should not be limited by the terms. These terms are used only for the purpose of distinguishing one component from another component.

The terms used herein are only used to describe certain embodiments of the disclosure and are not intended to limit the disclosure. As used herein, the singular expressions are intended to include plural forms as well, unless the context clearly dictates otherwise. Throughout the specification, when an element is referred to as being "connected" to another element, it should be understood to mean that the element is "directly connected" to the other element or is "electrically connected" to the other element while having another element therebetween. It will be understood that when an element is referred to as "including" another element, the element may further include other elements unless mentioned otherwise.

In the disclosure, and particularly, in the claims, the term "the" and demonstratives similar thereto may indicate both a singular form and a plural form. Operations of methods according to the disclosure described herein may be performed in an appropriate order unless explicitly stated otherwise. The disclosure is not limited by the order in which the operations are performed.

As used herein, expressions such as "in some embodiments of the disclosure" or "in one embodiment of the disclosure" do not necessarily refer to the same embodiment of the disclosure.

Some embodiments of the disclosure may be represented by functional block configurations and various operations. Some or all of these functional blocks may be implemented by various numbers of hardware and/or software configurations for performing particular functions. For example, functional blocks of the disclosure may be implemented by one or more microprocessors or by circuit configurations for certain functions. For example, the functional blocks as set forth herein may be implemented in various programming or scripting languages. The functional blocks may be implemented with an algorithm executed by one or more processors. Related art may be employed in the disclosure for electronic configuration, signal processing, and/or data processing. Terms such as "mechanism", "element", "means" and "configuration" can be used broadly and are not limited to mechanical and physical configurations.

In the drawings, lines or members for connection between components are merely illustrative of functional connections and/or physical or circuit connections. Actually, connections between components of a device may be represented by various functional connections, physical connections, or circuit connections that are replaceable or added.

The disclosure will now be described in detail with reference to the accompanying drawings.

FIG. 1 is a schematic diagram of a system according to an embodiment of the disclosure.

Referring to FIG. 1, the system according to an embodiment may include an image display apparatus 100, an image processing device 200, a source device 300, and a remote control device 400.

In one embodiment of the disclosure, the image display apparatus 100 (e.g., a TV) and the image processing device 200 (e.g., an audio/video (AV) receiver 201) may be connected through a high-definition multimedia interface (HDMI) cable. In addition, the image processing device 200 may be connected to the source device 300 (e.g., a BD player 301 and a set-top box 302, and an OTT box 303) through an HDMI cable.

In one embodiment of the disclosure, the image display apparatus 100 of FIGS. 2 and 3 (hereinafter referred to as the image display apparatus 100) may be embodied as an apparatus including a display 110 of FIG. 3.

In one embodiment of the disclosure, the image display apparatus 100 may be a TV but is not limited thereto. For example, the image display apparatus 100 may be embodied as various types of electronic devices, such as a desk top computer, a tablet PC, a laptop computer, a cellular phone, an e-book terminal, a digital broadcasting terminal, a personal digital assistant (PDA), a portable multimedia player (PMP), a navigation device, a digital camera, a camcorder, an MP3 player, and a wearable device. The image display apparatus 100 may be a fixed or mobile type and may be a digital broadcast receiver capable of receiving digital broadcasts.

In one embodiment of the disclosure, the image display apparatus 100 may be embodied as a curved display device with a screen having a curvature or a flexible display device with a screen, the curvature of which is adjustable, as well as a flat display device. An output resolution of the image display apparatus 100 may include, for example, a high-definition (HD) resolution, a full HD resolution, an ultra HD resolution, or a clearer resolution than an ultra HD resolution. In one embodiment of the disclosure, the image display apparatus 100 may output content (images and sound data) input through various external input sources (e.g., a set-top box and the like).

In one embodiment of the disclosure, the image display apparatus 100 is capable of easily controlling external devices supporting a high-definition multimedia interface consumer electronics control (HDMI CEC) communication function (hereinafter referred to as a 'CEC function').

The image display apparatus 100 supporting the CEC function may communicate with external devices supporting the CEC function by transmitting a CEC message to or receiving a CEC message to the external devices.

In one embodiment of the disclosure, the image processing device 200 may include an AV receiver 201, an AV amplifier (not shown), and the like but is not limited thereto.

In one embodiment of the disclosure, the image processing device 200 may decode a sound signal received from an external input source device and process a result of the decoding by a digital signal processor (DSP). The image processing device 200 may image-process an image signal received from a source device by upscaling the image signal or performing a bypass function to directly transmit the image signal to the image display apparatus 100 (e.g., a TV). In addition, the image processing device 200 may serve as a power amplifier that amplifies a signal converted into an analog signal and transmits the amplified signal to a speaker of each channel.

In one embodiment of the disclosure, the source device 300 may be a device that receives a broadcast signal via a communication network and transmits the broadcast signal to an output device (e.g., the in image display apparatus 100 or the image processing device 200. In one embodiment of the disclosure, the source device 300 may receive a broadcast signal, convert the broadcast signal into an image, voice, text or the like by using a decoder, and transmit a result of the conversion to the output device. In one embodiment of the disclosure, the source device 300 may be a device that reproduces content.

In one embodiment of the disclosure, the source device 300 may include, but is not limited to, the BD player 301, the set-top box 302, the OTT box 303, a DVD player, and the like.

In one embodiment of the disclosure, the source device 300 may be connected to the image processing device 100 through the image processing device 200. In one embodiment of the disclosure, the source device 300 may be connected to an HDMI connection port of the image processing device 200, and the image processing device 200 may be connected to an HDMI connection port of the image processing device 100.

In one embodiment of the disclosure, when the source device 300 supports the CEC function, the source device 300 may communicate with the image display apparatus 100 supporting the CEC function by transmitting a CEC message to and receiving a CEC message from the image display apparatus 100.

In one embodiment of the disclosure, the image display apparatus 100 may select the source device 300 connected thereto through the image processing device 200 to receive content. That is, the image display apparatus 100 may select or change the source device 300 for receiving content, i.e., an external input source (hereinafter referred to as an "input mode").

In one embodiment of the disclosure, the content includes image data, audio data, text data, and the like and may be a broadcast signal or data converted from a broadcast signal but is not limited thereto. In one embodiment of the disclosure, the content may include data provided from the source device 300 to the output device (the image display apparatus 100 and/or the image processing device 200).

In one embodiment of the disclosure, when the image display apparatus 100 is connected to the source device 300 through the image processing device 200, the image display apparatus 100 may automatically identify the source device 300 and automatically set source information about the source device 300. For example, the user does not need to input the source information including a manufacturer's name, device name, HDMI connection port information, etc. of the source device 300, and the image display apparatus 100 may automatically identify the source information and create a table about the source information.

Thus, the image display apparatus 300 may display a user interface including source information (e.g., a manufacturer's name) included in a pre-generated table, and, when a user selects the source information (e.g., the manufacturer's name), the image display apparatus 300 may change an external input mode to a source device corresponding to the selected source information.

In one embodiment of the disclosure, in order for the image display apparatus 100 to change to the source device 300 selected as an input mode according to a user input, physical address information indicating an HDMI connection port to which the image processing device 200 is connected and an HDMI connection port of the image processing device 200 to which the source device 300 is connected is needed. That is, HDMI connection port information of the image processing device 200 connected to the image display apparatus 100 (hereinafter referred to as 'first HDMI connection port information') and HDMI connection port information of the source device 300 connected to the image processing device 200 (hereinafter referred to as 'second HDMI connection port information') are needed.

For example, the image processing device 200 (e.g., an AV receiver) may be connected to a second HDMI connection port among a plurality of HDMI connection ports included in the image display apparatus 100 (e.g., a TV), and the source device 300 (e.g., a set-top box) may be connected to a third HDMI connection port of the image processing device 200. In this case, the HDMI connection port information of the source device 300 may be described as 'physical address information' of the source device 300. In one embodiment of the disclosure, based on physical address information corresponding to source information selected according to a user input, the image display apparatus 100 may change an input mode to a source device corresponding to the selected source information.

In one embodiment of the disclosure, when the source device 300 is a device supporting a CEC function of transmitting and receiving a CEC message, the image display apparatus 100 may automatically identify and set the source information (physical address information and device identification information) of the source device 30 while transmitting or receiving a CEC message through the CEC function. An example of creating a table of a source device by storing source information obtained by transmitting or receiving a CEC message will be described in more detail with reference to FIG. 8 below.

In another embodiment of the disclosure, the source device 300 may be a device that does not support the CEC function of transmitting and receiving a CEC message. Even when the image display apparatus 100 is connected to the source device 300, which does not provide the CEC function, through the image processing device 200, the image display apparatus 100 may automatically identify the source device 300 and automatically set source information about the source device 300.

In one embodiment of the disclosure, the source device 300 may support an IR control function of setting an integrated remote control (e.g., a Multi-Brand Remote control (MBR) function (hereinafter referred to as "MBR function")). That is, the source device 300 may receive a control signal (an MBR key) transmitted from the image display apparatus 100 through an MBR key receiver 3002 of FIG. 4.

Figure 4:
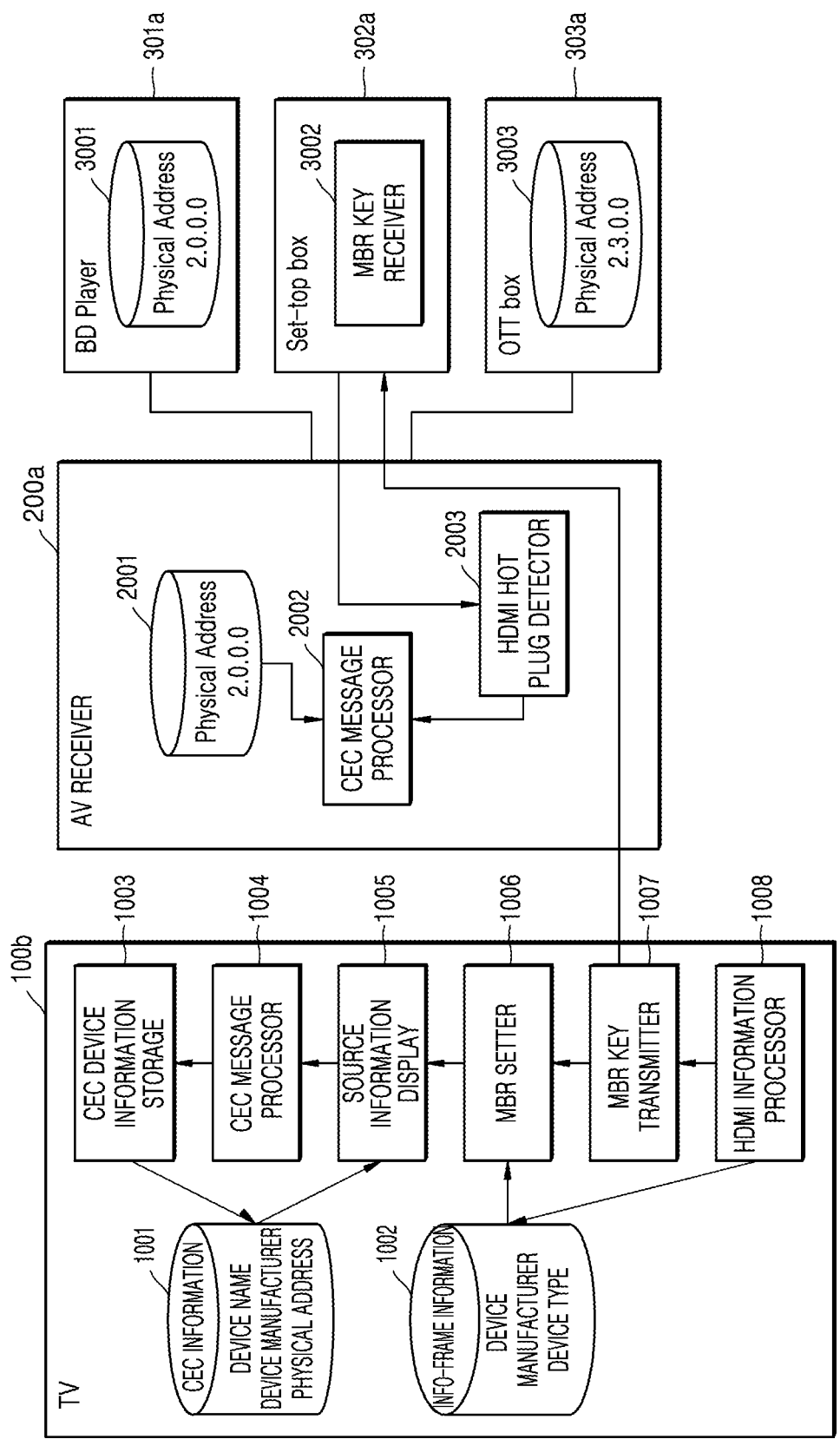
FIG. 4 is a detailed block diagram of a system according to an embodiment of the disclosure.

Accordingly, the image display apparatus 100 may transmit a control signal (an MBR key) included in a remote control code set stored in advance through an MBR key transmitter 1007 of FIG. 4, and set source information about the source device 300 according to HDMI info-frame information transmitted by the source device 300 in response to the control signal.

That is, the image display apparatus 100 may automatically create a table including the source information about the source device 300 through the MBR function.

An example of creating a table of a source device by obtaining the source information through the MBR function will be described in more detail with reference to FIG. 11 below.

In one embodiment of the disclosure, even when the source device 300 connected to the image display apparatus 100 supports the CEC function or does not support the CEC function, source information need not be set by a user but may be automatically set by the image display apparatus 100.

Accordingly, according to an embodiment of the disclosure, it is possible to reduce inconvenience caused when source information about an external input source device is set according to a user input.

In one embodiment of the disclosure, the image display apparatus 100 may display automatically set source information (e.g., a device name) on a user interface, and change an input mode to the selected source device 300 according to a user input to select the displayed source information (e.g., the device name).

Accordingly, in one embodiment of the disclosure, in order to change to an external input mode in the image display apparatus 100 to receive content, a user may easily change to the external input source by simply inputting an input to select the device identification information (e.g., a device name and a manufacturer's name) of the source device 300 displayed on the user interface without having to set information about the source device 300 in advance.

In one embodiment of the disclosure, the control device 400 may be embodied as various types of devices, such as a remote control or a cellular phone, for control of the image display apparatus 100.

Alternatively, when the image display apparatus 100 includes a display and the display is embodied as a touch screen, the control device 400 may be replaced with a user's finger, an input pen or the like.

Alternatively, the control device 400 may control the image display apparatus 100 through short-range communication, including infrared communication or Bluetooth. The control device 400 may control a function of the image display apparatus 100 by using at least one of keys (including buttons), a touch pad, a microphone (not shown) through which a user's voice is receivable, and a sensor (not shown) capable of identifying a motion of the control device 400 which are included therein.

The control device 400 may include a power on/off button for turning on or off a power supply of the image display apparatus 100. In addition, the control device 400 may change a channel of the image display apparatus 100, perform volume control, select a terrestrial broadcast, a cable broadcast, or a satellite broadcast, or perform configuration setting according to a user input.

The control device 400 may be a pointing device. For example, the control device 400 may function as a pointing device when receiving a certain key input.

FIG. 1 is provided to describe an embodiment of the disclosure and thus embodiments of the disclosure are not limited thereto.

Figure 2:
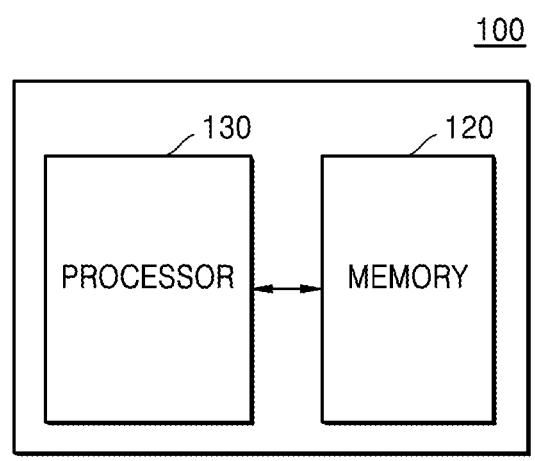
FIGS. 2 and 3 are block diagrams of an image display apparatus according to an embodiment of the disclosure.
Figure 3:
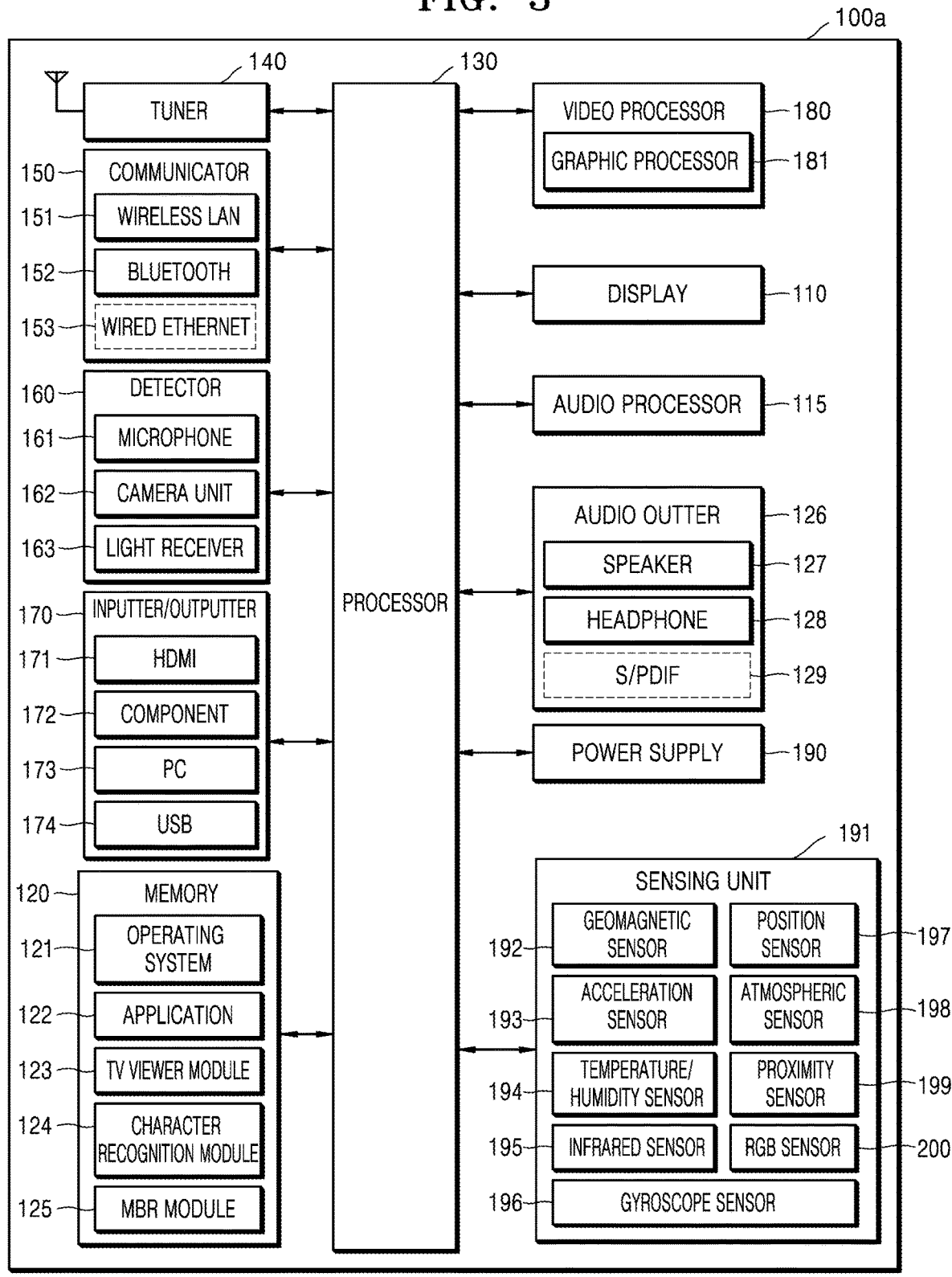

FIGS. 2 and 3 are block diagrams of an image display apparatus according to an embodiment of the disclosure.

As illustrated in FIG. 2, in one embodiment of the disclosure, an image display apparatus 100 may include a memory 120 and a processor 130. However, not all of the illustrated components are essential components. The image display apparatus 100 may include more or fewer components than the illustrated components.

For example, as illustrated in FIG. 3, in one embodiment of the disclosure, the image display apparatus 100 may further include a display 110, a tuner 140, a communicator 150, a detector 160, an inputter/outputter 170, a video processor 180, an audio processor 115, an audio outputter 126, a power supply 190, and a sensing unit 191, as well as the memory 120 and the processor 130.

The image display apparatus 100a of FIG. 3 may be an embodiment of the image display apparatus 100 of FIGS. 1 and 2 according to the disclosure.

These components will be described below.

A processor 130 controls overall operations of the image display apparatus 100 and a signal flow between the internal components of the image display apparatus 100, and performs a data processing function. The processor 130 may execute an operation system (OS) and various applications stored in the memory 120 when there is a user input or a preset and stored condition is satisfied.

The processor 130 may include a random access memory (RAM) which stores a signal or data input from the outside of the image display apparatus 100 or is used as a storage region corresponding to various operations performed by the image display apparatus 100, and a read-only memory (ROM) which stores a control program for control of the image display apparatus 100.

The processor 130 may include a graphic processing unit (GPU) (not shown) to process graphics corresponding to video. The processor 130 may be embodied as a System-on-Chip (SoC) which is a combination of a core (not shown) and a GPU (not shown). The processor 130 may include a single core, dual cores, triple cores, quad cores, or multiple cores.

Alternatively, the processor 130 may include a plurality of processors. For example, the processor 130 may be embodied as including a main processor (not shown) and a sub-processor (not shown) that operates in a sleep mode.

In one embodiment of the disclosure, the processor 130 may execute one or more instructions stored in the memory 120 to create a table including physical address information of at least one source device 300 connected thereto through the image processing device 200 and device identification information corresponding to the physical address information.

In one embodiment of the disclosure, the processor 130 may execute the one or more instructions stored in the memory 120 to transmit a request message requesting physical address information of the source device 300 to the source device 300, receive a response message, including the physical address information of the source device 300, transmitted from the source device 300 in response to the request message, and create a table including the physical address information included in the response message.

In one embodiment of the disclosure, the processor 130 may execute the one or more instructions stored in the memory 120 to transmit a request message requesting device identification information of the source device 300 to the source device 300, receive a response message, which includes the device identification information of the source device 300 and is transmitted in response to the request message, from the source device 300, and create a table such that the device identification information included in the received response message corresponds to the physical address information of the source device 300.

In one embodiment of the disclosure, the processor 130 may execute the one or more instructions stored in the memory 120 to transmit a control signal included in a remote control code set stored in the memory 120, receive physical address information of the source device 300 responding to the control signal from the image processing device 200, the physical address information being identified by the image processing device 200 and transmitted in response to the control signal, and create a table including the received physical address information. The image processing device 200 may change to an input mode of the source device 300 responding to the control signal included in the remote control code set, and transmit the physical address information of the source device 300 to the image display apparatus 100.

In one embodiment of the disclosure, the processor 130 may execute the one or more instructions stored in the memory 120 to display a user interface including device identification information included in the table.

In one embodiment of the disclosure, the processor 130 may execute the one or more instructions stored in the memory 120 to change to an input mode of a source device corresponding to device identification information selected in response to a user input to select device identification information, based on physical address information corresponding to the selected device identification information.

In one embodiment of the disclosure, the processor 130 may execute the one or more instructions stored in the memory 120 to transmit a request message requesting change of an input mode to the source device 300 corresponding to the selected device identification information, based on the physical address information corresponding to the selected device identification information, and receive a response message identifying the input mode change from the source device 300, the response message being transmitted in response to the request message.

In one embodiment of the disclosure, the processor 130 may execute the one or more instructions stored in the memory 120 to control a source device corresponding to the device identification information by using a remote control code set corresponding to the selected device identification information.

The memory 120 may store various data, programs, or applications for driving and controlling the image display apparatus 100 under control of the processor 130. The memory 120 may store signals or data input/output to correspond to driving of the video processor 180, the display 110, the audio processor 115, the audio outputter 126, the power supply 130, the tuner 140, the communicator 150, the detector 160, and the inputter/outputter 170.

The memory 120 may store an operating system 121 for control of the image display apparatus 100 and the processor 130, an application 122 initially provided from the manufacturer or downloaded from the outside, a graphical user interface (GUI) related to applications, objects (e.g., images, text, icons, buttons, etc.) for providing the GUI, user information, documents, databases, or related data.

The memory 120 may further include a TV viewer module 123 storing one or more instructions to receive an input signal from a remote control device (not shown) and perform channel control corresponding to the input signal or to enter a channel scroll user interface mode when an input signal corresponds to a predetermined input, a character recognition module 124 storing one or more instructions to recognize information from content received from an external device (not shown), and a memory buffer register (MBR) module 125 storing one or more instructions for channel control from an external device (not shown).

The memory 120 includes a ROM, a RAM, or a memory card (e.g., a micro SD card or a USB memory (not shown)) mounted in the image display apparatus 100. Alternatively, the memory 120 may include a non-volatile memory, a volatile memory, a hard disk drive (HDD), or a solid-state drive (SSD).

In one embodiment of the disclosure, the memory 120 may include at least one type storage medium among a flash memory type storage medium, a hard disk type storage medium, a multimedia card micro type storage medium, a card type memory (e.g., SD or XD memory), a random access memory (RAM), a static RAM (SRAM), a read-only memory (ROM), an electrically erasable programmable ROM (EEPROM), a programmable ROM (PROM), a magnetic memory, a magnetic disk, and an optical disk.

In one embodiment of the disclosure, the memory 120 may store physical address information of the source device 300, the physical address information including first connection port information of the image display apparatus 100 with respect to the image processing device 200 and second connection port information of the image processing device 200 with respect to the source device 300.

In one embodiment of the disclosure, the memory 120 may store a table including a plurality of pieces of device identification information (e.g., device name, a manufacturer's name, model name, etc.), each of which matches physical address information of one of at least one source device 300.

In one embodiment of the disclosure, the memory 120 may store a plurality of remote control code sets for controlling an external device.

The display 110 displays on a screen a video included in a broadcast signal received via the tuner 140 of FIG. 3, under control of the processor 130. The display 110 may display content (e.g., a moving image) input via the communicator 150 or the inputter/outputter 170. The display 110 may output an image stored in the memory 120 under control of the controller 130.

The display 110 generates a driving signal by converting an image signal, a data signal, an on-screen display (OSD) signal, a control signal or the like processed by the processor 130. The display 110 may be embodied as a plasma display panel (PDP), a liquid crystal panel (LCD), an organic light-emitting diode (OLED), a flexible display, or the like or may be embodied as a three-dimensional (3D) display. Alternatively, the display 110 may be configured as a touch screen to be used as an input device, in addition to an output device.

In one embodiment of the disclosure, the display 110 of the image display apparatus 100 may be embodied as a PDP, an LCD, an OLED, a cathode ray tube (CRT), or the like.

In one embodiment of the disclosure, the display 110 may display a user interface including device identification information (e.g., device name or a manufacturer's name) of the source device 300.

The tuner 140 may select only a frequency of a channel to be received by the image display apparatus 100 among various radio wave components by tuning only the frequency of the channel by performing amplification, mixing, or resonance on a broadcast signal received via wire or wirelessly. The broadcast signal includes audio data, video and additional information (e.g., an electronic program guide (EPG)).

The tuner 140 may receive a broadcast signal in a frequency band corresponding to a channel number according to a user input (e.g., a control signal received from a remote control device (not shown), for example, a channel number input, a channel up-down input, and a channel input in an EPG screen).

The tuner 140 may receive a broadcast signal from various sources such as terrestrial broadcasting, cable broadcasting, satellite broadcasting, Internet broadcasting, and the like. The tuner 140 may receive a broadcast signal from a source such as analog broadcasting or digital broadcasting. Decoding (e.g., audio decoding, video decoding, or supplementary information decoding) is performed on the broadcast signal received via the tuner 140 to divide the broadcast signal into audio data, video and/or additional information. The audio data, the video and/or the additional information may be stored in the memory 120 under control of the processor 130.

The image display apparatus 100 may include one or more tuners 140. The tuner 140 may be embodied as either an all-in-one device including the image display apparatus 100, a separate device (e.g., a set-top box (not shown) which includes a tuner electrically connected to the image display apparatus 100, or a tuner (not shown) connected to the inputter/outputter 170.

The communicator 150 may connect the image display apparatus 100 to an external device (not shown) (e.g., an audio device) under control of the processor 130. The processor 130 may transmit content to or receive content from an external device (not shown) connected thereto via the communicator 150, download an application from the external device, or perform web browsing. The communicator 150 may include one of a wireless LAN 151, a Bluetooth module 152, and a wired Ethernet module 153 to correspond to the performance and structure of the image display apparatus 100. Alternatively, the communicator 150 may include a combination of the wireless LAN 151, the Bluetooth module 152, and the wired Ethernet module 153.

The communicator 650 may receive a control signal from a remote control device (not shown) under control of the processor 130. The control signal may be embodied as a Bluetooth type, an RF signal type, or a Wi-Fi type.

The communicator 150 may further include a short-range communication module (e.g., a near-field communication (NFC) module) (not shown) or a Bluetooth low energy (BLE) module (not shown), as well as the Bluetooth module 152.

The detector 160 may detect a user's voice, video, or interaction, and include a microphone 161, a camera 162, and a light receiver 163.

The microphone 161 receives the user's uttered voice. The microphone 161 may convert received voice into an electric signal and output the electric signal to the processor 130. The user's voice may include, for example, voice corresponding to a menu or function of the image display apparatus 100.

The camera 162 may obtain an image frame such as a still image or a video. An image obtained by an image sensor may be processed through the processor 130 or a separate image processor (not shown).

An image frame processed by the camera 162 may be stored in the memory 120 or transmitted to the outside via the communicator 150. Two or more cameras 162 may be provided according to a configuration of the image display apparatus 100.

The light receiver 163 receives an optical signal (including a control signal) from an external remote control device (not shown). The light receiver 163 may receive an optical signal corresponding to a user input (e.g., touching, pressing, a touch gesture, voice, or a motion) from a remote control device (not shown). The control signal may be extracted from the received optical signal under control of the processor 130. For example, the light receiver 163 may receive a control signal corresponding to a channel up/down button for channel switching from a remote control device (not shown).

The inputter/outputter 170 receives a video (e.g., a moving picture), an audio signal (e.g., voice or music), and additional information (e.g., an EPG) from the outside of the image display apparatus 100, under control of the processor 130. The inputter/outputter 170 may include at least one of a high-definition multimedia interface (HDMI) port 171, a component jack 172, a PC port 173, or a USB port 174. The inputter/outputter 170 may include at least one combination of the HDMI port 171, the component jack 172, the PC port 173, or the USB port 174. An external image providing device (not shown) may be connected through the HDMI port 171.

The video processor 180 processes video data received by the image display apparatus 100. The video processor 180 may perform various image processing, such as decoding, scaling, noise filtering, frame rate conversion, resolution conversion, and the like, on the video data.

A graphic processor 181 generates a screen including various objects, such as an icon, an image, and text, using an operation unit (not shown) and a renderer (not shown). The operation unit calculates attribute values, such as coordinates, a shape, a size, and color, of each object to be displayed according to a layout of the screen by using a user input detected by the detector 160. The renderer generates screens of various layouts including objects, based on the attribute values calculated by the operation unit. The screen generated by the renderer is displayed on a display area of the display 110.

The audio processor 115 processes audio data. The audio processor 115 may perform various operations, such as decoding, amplification, and noise filtering, on the audio data. The audio processor 115 may include a plurality of audio processing modules to process audio data corresponding to a plurality of pieces of content.

The audio outputter 126 outputs audio data included in a broadcast signal received via the tuner 140 under control of the processor 130. The audio outputter 126 may output audio data (e.g., voice or sound) input via the communicator 150 or the inputter/outputter 170. The audio outputter 126 may output audio data stored in the memory 120 under control of the processor 130. The audio outputter 126 may include at least one of a speaker 127, a headphone output terminal 128, or a Sony/Philips Digital Interface (S/PDIF) output terminal 129. The audio outputter 126 may include a combination of the speaker 127, the headphone output terminal 128 and the S/PDIF output terminal 129.

The power supply 190 supplies power from an external power source to the internal components of the image display apparatus 100 under control of the processor 130. Alternatively, the power supply 190 supplies power output from one or more batteries (not shown) included in the image display apparatus 100 to the internal components under control of the processor 130.

The sensing unit 191 may sense a status of the image display apparatus 100 or a status of surroundings of the image display apparatus 100 and transmit sensed information to the processor 130.

The sensing unit 191 may include at least one of, but is not limited to, a geomagnetic sensor 192, an acceleration sensor 193, a temperature/humidity sensor 194, an infrared sensor 195, a gyroscope sensor 196, a position sensor (e.g., a GPS) 197, an air pressure sensor 198, a proximity sensor 199, or an RGB sensor (illuminance sensor) 200. A function of each of these sensors is intuitively inferable by those of ordinary skill in the art from the name thereof and thus a detailed description thereof will be omitted here.

The image display apparatus 100 including the display 110 may be electrically connected to a separate external device (e.g., a set-top box (not shown)) including the tuner 140.

It will be easily understood by those of ordinary skill in the art that the image display apparatus 100 may be embodied as, but is not limited to, an analog TV, a digital TV, a 3D-TV, a smart TV, an LED TV, an OLED TV, a plasma TV, a monitor, or the like.

The block diagrams of the illustrated image display apparatuses 100 and 100a are block diagrams according to embodiments of the disclosure. The components of the block diagram may be combined together or omitted or new components may be added thereto according to the specifications of the image display apparatus 100 that is actually implemented. That is, two or more components may be combined into one component or one component may be divided into two or more components as needed. A function performed in each block is only provided to explain embodiments of the disclosure and the scope of the disclosure should not be construed as being limited to a specific operation or device therefor.

FIG. 4 is a detailed block diagram of a system according to an embodiment of the disclosure.

An image display apparatus 100b of FIG. 4 may be an embodiment of the image display apparatus 100 of FIGS. 1 and 2 according to the disclosure. The image display apparatus 100b may be a TV but is not limited thereto.

In one embodiment of the disclosure, the image display apparatus 100b may include a CEC device information storage 1003, a CEC message processor 1004, a source information display 1005, an MBR setter 1006, and an MBR key transmitter 1007.

In one embodiment of the disclosure, the CEC message processor 1004 may transmit a CEC message to and receive a CEC message from a device supporting the CEC function. For example, the CEC message processor 1004 may generate a CEC request message to ask the source device 300 supporting the CEC function about physical address information, device name, a manufacturer's name, etc., transmits the CEC request message to the source device 300, and transmits a CEC message received in response to the transmitted CEC message to the CEC device information storage 1003.

The CEC device information storage 1003 may store source information about the source device 300, which is included in the received CEC message, in a CEC information database 1001.

The source information display 1005 may display the source information (physical address information, device name, a manufacturer's name, etc.).

The HDMI information processor 1008 may receive HDMI info-frame information from a device connected thereto through an HDMI cable, and store information, such as a device manufacturer's name, a device type, and a model name, which are included in the info-frame information, in an info-frame information database 1002.

The MBR key transmitter 1007 may select a remote control code set corresponding to the manufacturer's name, the model name, etc., and transmit a control signal, based on the info-frame information stored in the info-frame information database 1002, and transmit a control signal.

The MBR setter 1006 may set a remote control code set for controlling an external device, based on the HDMI info-frame information. In addition, the MBR setter 1006 may provide a user interface for setting a remote control code set.

The CEC information database 1001 may store device name, a manufacturer's name, physical address information, etc. of an external device, which are obtained through a CEC message.

The info-frame information database 1002 may store information, such as a manufacturer's name, device type, and the like, of an external device, which is obtained through an HDMI info-frame.

FIG. 4 illustrates the CEC device information storage 1003, the CEC message processor 1004, the source information display 1005, the MBR setter 1006, and the MBR key transmitter 1007, which are included in the image display apparatus 100b, as modules that perform independent operations, but the disclosure is not limited thereto. In one embodiment of the disclosure, the operations performed by the CEC device information storage 1003, the CEC message processor 1004, the source information display 1005, the MBR setter 1006, and the MBR key transmitter 1007 may be performed by executing the one or more instructions stored in the memory 120 of FIG. 3 by the processor 130 of FIGS. 2 and 3.

The CEC information database 1001 and the info-frame information database 1002 of FIG. 4 may be databases stored in the memory 120 of FIGS. 2 and 3.

An image processing device 200a of FIG. 4 may be an embodiment of the image processing device 200 of FIG. 1 according to the disclosure. The image processing device 200a may be an AV receiver but is not limited thereto.

In one embodiment of the disclosure, the image processing device 200a may include a CEC message processor 2002 and an HDMI hot plug detector 2003.

The CEC message processor 2002 may create a CEC messages and transmit a CEC message to or receive a CEC message from devices performing the CEC function.

The HDMI hot plug detector 2003 may detect connection of an external device to at least one HDMI input port provided in the image processing device 200a.

The physical address information database 2001 may store physical address information of the image processing device 200a.

Operations performed by the CEC message processor 2002 and the HDMI hot plug detector 2003 which are included in the image processing device 200a of FIG. 4 may be performed by a processor (not shown) of the image processing device 200a configured to execute one or more instructions stored in a memory (not shown) of the image processing device 2001.

The physical address information database 2001 of the image processing device 200a (e.g., an AV receiver) of FIG. 4 may be a database stored in a memory (not shown) of the image processing device 200a.

A first source device 301a of FIG. 4 may be an embodiment of the BD player 301 of FIG. 1 according to the disclosure. A second source device 302a of FIG. 4 may be an embodiment of the set-top box 302 of FIG. 1 according to the disclosure. A third source device 303a of FIG. 4 may be an embodiment of the OTT box 303 of FIG. 1 according to the disclosure.

In one embodiment of the disclosure, when the first source device 301a supports the CEC function, the first source device 301a may include a physical address information database 3001. In one embodiment of the disclosure, the first source device 301a may include an MBR key receiver (not shown).

In one embodiment of the disclosure, the second source device 302a may include an MBR key receiver 3002. The MBR key receiver 3002 may receive an MBR key transmitted by the image display apparatus 100.

In one embodiment of the disclosure, when the third source device 303a supports the CEC function, the first source device 303a may include a physical address information database 3003. In one embodiment of the disclosure, the third source device 303a may include an MBR key receiver (not shown).

In one embodiment of the disclosure, the first and third source devices 301a and 303a may receive an MBR key transmitted by the image display apparatus 100 through an MBR key receiver (not shown). The block diagram of FIG. 4 illustrates an embodiment of the disclosure and the disclosure is not limited thereto.

Figure 5:
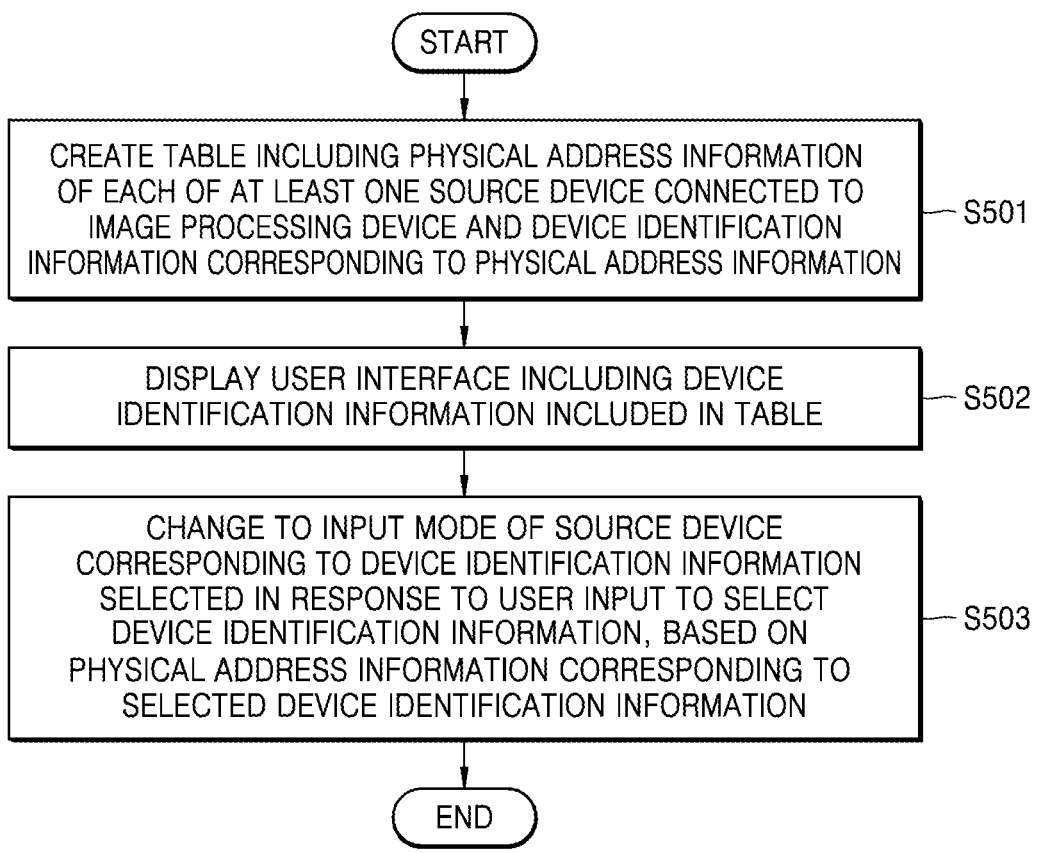
FIG. 5 is a flowchart of an operating method of an image display apparatus according to an embodiment of the disclosure.
Figure 7:
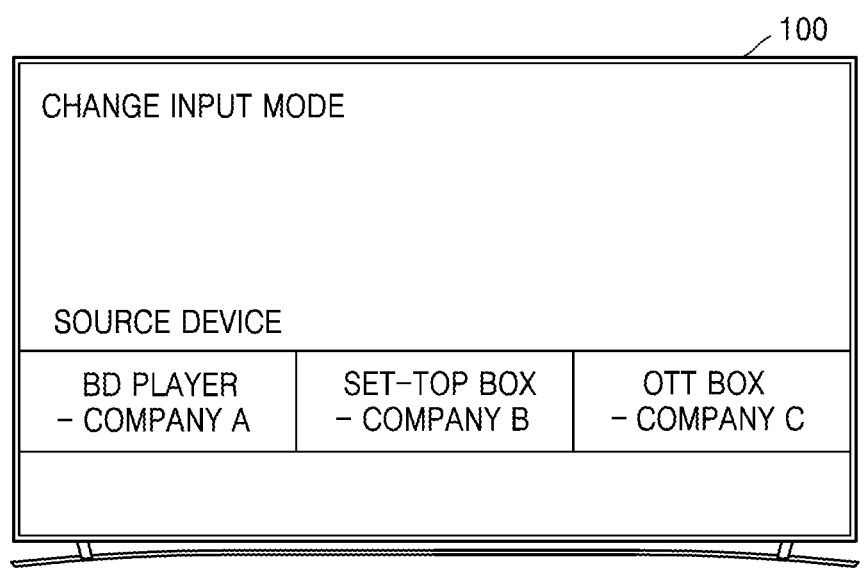
FIG. 7 is a diagram illustrating an example in which an image display apparatus provides a user interface, according to an embodiment of the disclosure.
Figure 7:
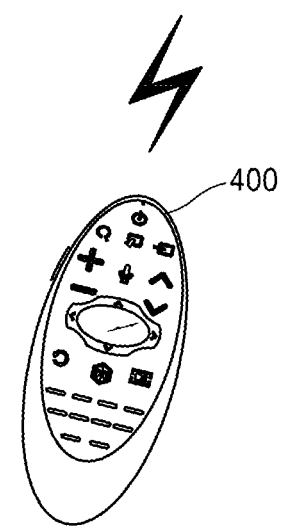

FIG. 5 is a flowchart of an operating method of an image display apparatus according to an embodiment of the disclosure. FIG. 6 is a diagram for explaining an example of creating a table according to an embodiment of the disclosure. FIG. 7 is a diagram illustrating an example in which an image display apparatus provides a user interface, according to an embodiment of the disclosure. The flowchart of FIG. 5 will now be described with reference to FIGS. 6 and 7.

FIG. 5 is a flowchart of an example in which a table including source information about the source device 300 is automatically set by the image display apparatus 100.

In operation S501 of FIG. 5, the image display apparatus 100 may create a table including physical address information of at least one source device 300 connected to the image processing device 200 and device identification information corresponding to the physical address information.

In one embodiment of the disclosure, the image display apparatus 100 may be connected to the image processing device 200 through an HDMI cable. The image processing device 200 may be connected to the source device 300 through an HDMI cable.

In one embodiment of the disclosure, the image display apparatus 100 may obtain physical address information of the source device 300.

The physical address information of the source device 300 may include first HDMI connection port information of the image display apparatus 100 with respect to the image processing device 200 and second HMDI connection of the image processing device 200 with respect to the source device 300.

For example, when the image processing device 200 is connected to a second HDMI input port of the image display apparatus 100 and the source device 300 is connected to a third HDMI input port of the image processing device 200, the physical address information of the source device 300 may be <2.3.0.0>.

For example, the physical address information may include four bytes, and thus, when the image processing device 200 connected to the image display apparatus 100 has a depth of 1, devices may be connectable up to a depth of 4.

In one embodiment of the disclosure, the image display apparatus 100 may transmit a request message requesting the physical address information of the source device 300 to the source device 300. The image display apparatus 100 may receive a response message including the physical address information of the source device 300, which is transmitted in response to the request message, from the source device 300.

In one embodiment of the disclosure, the image display apparatus 100 may obtain the physical address information of the source device 300 by using a control signal included in a remote control code set stored in a memory. In one embodiment of the disclosure, the image display apparatus 100 may receive the physical address information of the source device 300 responding to the control signal included in the remote control code set from the image processing device 200 connected to the image display apparatus 100, the physical address information being verified by the image processing device 200. An example in which the image display apparatus 100 obtains the physical address information of the source device 300 according to an embodiment of the disclosure will be described in more detail with reference to FIGS. 9 and 12 below.

In one embodiment of the disclosure, the image display apparatus 100 may obtain device identification information of the source device 300.

In one embodiment of the disclosure, the device identification information of the source device 300 is information including a device type, a manufacturer's name, device name, etc. of the source device 300 that provides content.

In one embodiment of the disclosure, the image display apparatus 100 may transmit a request message requesting device identification information of the source device 300 to the source device 300, and receive a response message, which includes the device identification information and is transmitted in response to the request message, from the source device 300.

In one embodiment of the disclosure, the image display apparatus 100 may obtain the device identification information from the source device 300 responding to a control signal included in a remote control code set stored in a memory.

An example in which the image display apparatus 100 obtains the device identification information of the source device 300 according to an embodiment of the disclosure will be described in more detail with reference to FIGS. 8 and 11 below.

In one embodiment of the disclosure, the image display apparatus 100 may create and store a table including physical address information, which includes HDMI connection port information of the source device 300 connected to the image display apparatus through the image processing device 200, and device identification information corresponding to the physical address information.

In one embodiment of the disclosure, when a plurality of source devices are connected through the image processing device 200, the table may include source information about the plurality of source devices.

Referring to FIG. 6, for example, a table including physical address information (e.g., <2.1.0.0>) of the source device 300, which is obtained by the image display apparatus 100, and identification information (e.g., a BD player and company A) of the source device 300 corresponding to the physical address information may be created.

For example, a table including the source information about the source device 300 may include physical address information (e.g., <2.2.0.0>) of the source device 300 and identification information (e.g., a set-top box and company B) of the source device 300 corresponding to the physical address information.

For example, a table including source information may include physical address information (e.g., <2.3.0.0>) of the source device 300 and identification information (e.g., an OTT box and company C) of the source device 300 corresponding to the physical address information.

In one embodiment of the disclosure, when a power supply of the image display apparatus 100 is switched from an 'off' state to an 'on' state, the image display apparatus 100 may update the table including the source information about the source device 300. That is, the image display apparatus 100 may detect whether the source device 300 is additionally connected thereto through the image processing device 200 and add source information to the table.

In one embodiment of the disclosure, the image display apparatus 100 may detect connection of a device to an HMDI connection port thereof or update the table according to hot-plug detection. That is, the image display apparatus 100 may additionally add source information about the additionally connected source device 300 to the table.

In one embodiment of the disclosure, the image display device 100 may receive a CEC message from the source device 300 connected thereto through the image processing device 200 to add the source information about the source device 300 to the table and update the table. An example in which the image display apparatus 100 of FIG. 5 creates a table for automatically setting source information according to an embodiment of the disclosure will be described in more detail with reference to FIGS. 9 and 12 below.

In operation S502 of FIG. 5, the image display apparatus 100 may display a user interface including the device identification information included in the table.

As illustrated in FIG. 7, in one embodiment of the disclosure, the image display apparatus 100 may provide a user interface to select or switch to the source device 300 providing content.

In one embodiment of the disclosure, the image display apparatus 100 may display the device identification information about the source device 300 connected thereto through the image processing device 200.

Referring to FIG. 7, the user interface may include device types and manufacturers' names (e.g., "BD player—company A", "set-top box—company B", "OTT box—company C") as pieces of device identification information.

In one embodiment of the disclosure, the image display apparatus 100 may receive a user input signal for selecting select one of the pieces of device identification information included in the user interface, under control of the control device 400.

In operation S503 of FIG. 5, the image display apparatus 100 may change to an input mode of a source device corresponding to device identification information selected in response to a user input to select device identification information, based on physical address information corresponding to the selected device identification information.

For example, referring to FIG. 7, when receiving a user input to select the device identification information ("BD player—company A"), the image display apparatus 100 may search a pre-generated table (see FIG. 6) to determine physical address information (e.g., 2.1.0.0> stored to correspond to "BD player—company A"). The image display apparatus 100 may change an input mode to a source device connected to the first HDMI connection port of the image processing device 200 connected to the second HDMI connection port of the image display apparatus 100, based on the determined physical address information <2.1.0.0>.

In one embodiment of the disclosure, the image display apparatus 100 may broadcast a request message, which requests an input mode change and includes physical address information <2.1.0.0>, to induce to change an input mode to a source device corresponding to the physical address information <2.1.0.0>.

In one embodiment of the disclosure, the image display apparatus 100 may change an input mode to the source device 300 corresponding to the selected device identification information, and control the source device 300 by using a remote control code set corresponding to the selected device identification information.

In one embodiment of the disclosure, as device identification information (e.g., "BD player—company A", see FIG. 7) is selected, the image display apparatus 100 may receive a user input to select another device identification information (e.g., "set-top box—company B", see FIG. 7) while an input mode is changed to a first source device corresponding to the device identification information (e.g., "BD player—company A"). In this case, the image display apparatus 100 may induce to change an input mode to a second source device corresponding to the selected device identification information ("set-top box—company B"). In one embodiment of the disclosure, when receiving a user input to select another device identification information (e.g., "set-top box—company B", see FIG. 7), the image display apparatus 100 may transmit a signal indicating an input mode change to the first source device, which corresponds to the device identification information ("BD player—company A") and is set as a current input mode. In one embodiment of the disclosure, the image display apparatus 100 may transmit a control signal instructing to turn off a power supply to the first source device corresponding to the device identification information ("BD player—company A"). An example in which input mode changing is performed by the image display apparatus 100 of FIG. 5 according to an embodiment of the disclosure will be described in more detail with reference to FIGS. 10 and 13 below.

FIGS. 5 to 7 illustrates embodiments of the disclosure and the disclosure is not limited thereto.

Figure 8:
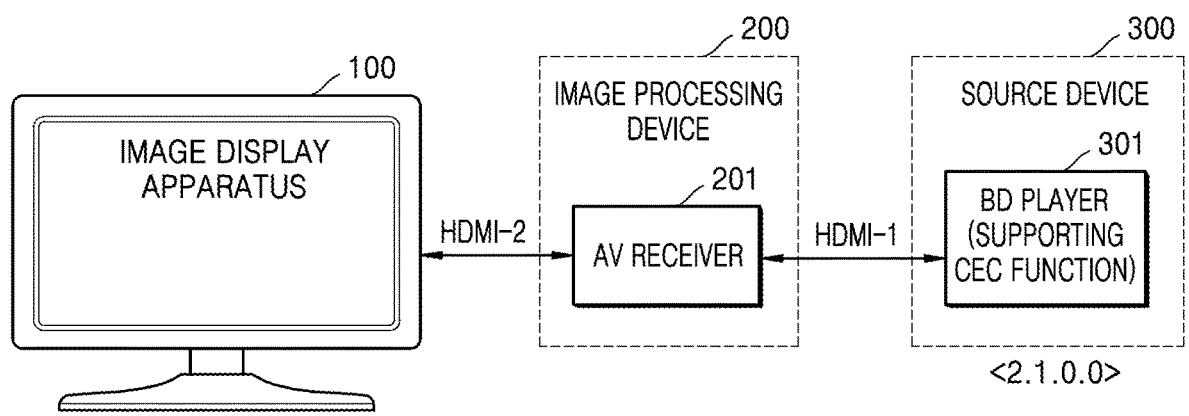
FIG. 8 is a diagram for explaining an example of connecting a system according to an embodiment of the disclosure.
Figure 9:
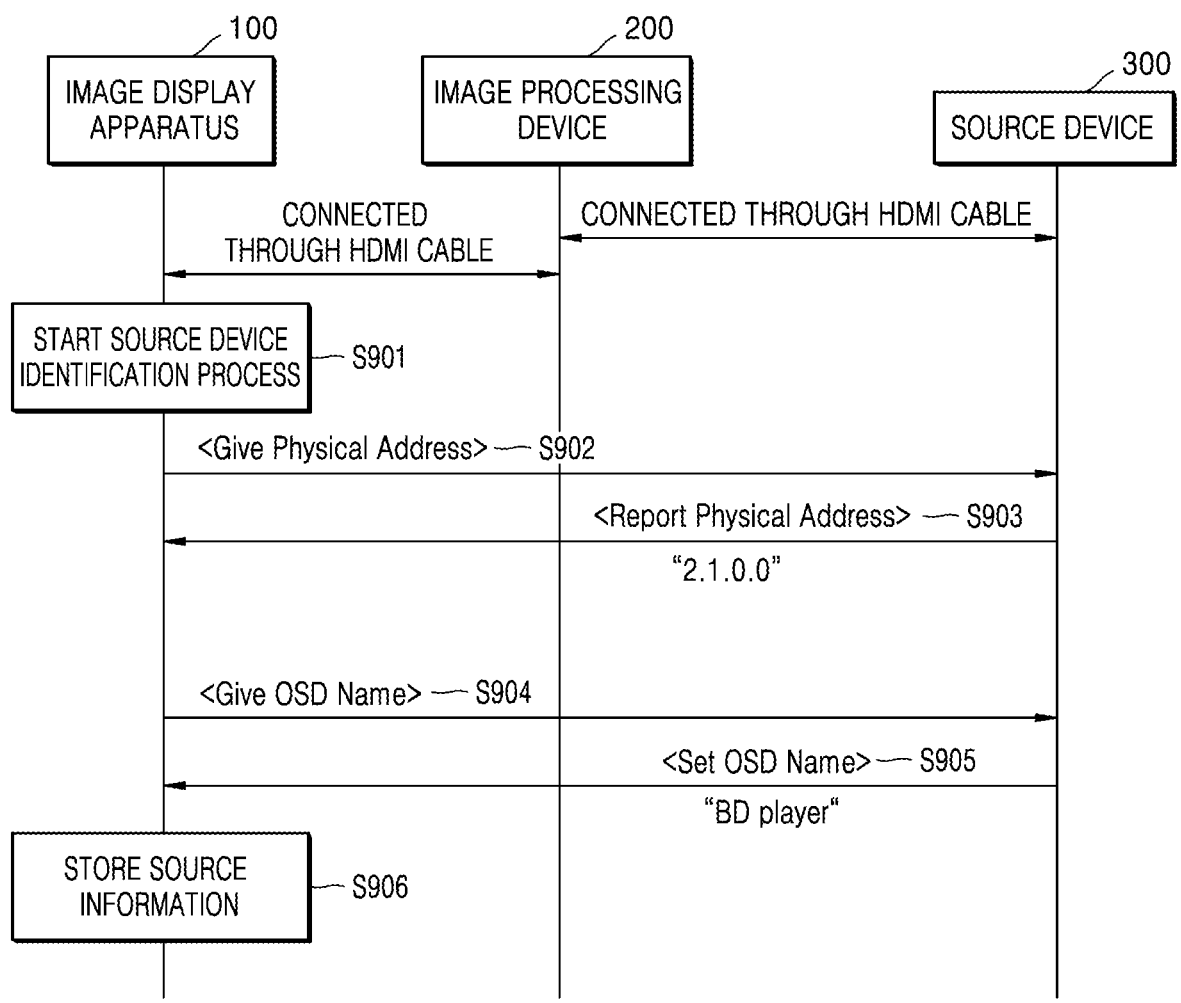
FIG. 9 is a flowchart illustrating an example in which a source device providing content is set by an image display apparatus according to an embodiment of the disclosure.
Figure 10:
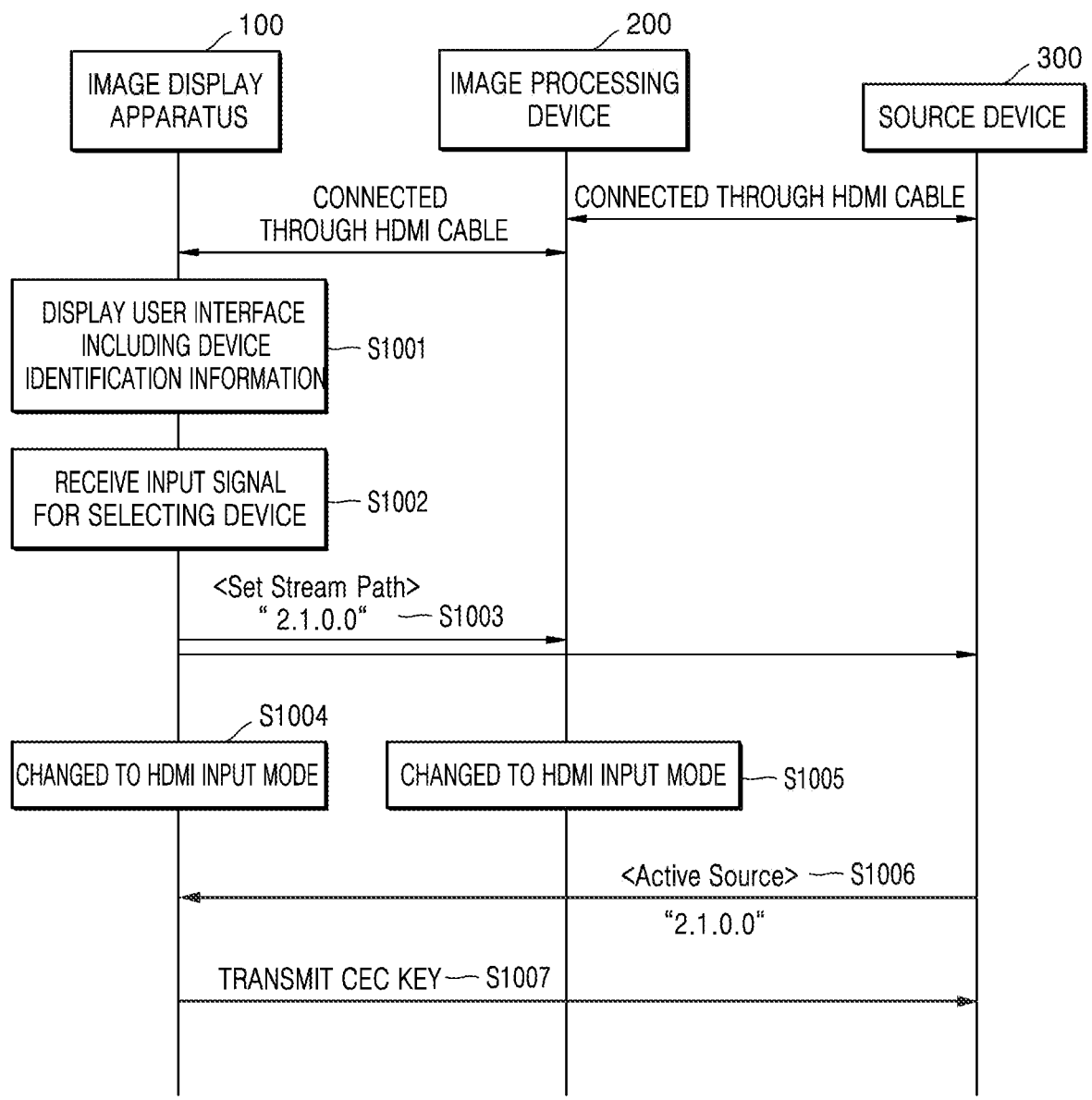
FIG. 10 is a diagram illustrating an example in which an input mode is changed by an image display apparatus, according to an embodiment of the disclosure.

FIG. 8 is a diagram for explaining an example of connecting a system according to an embodiment of the disclosure. FIG. 9 is a flowchart illustrating an example in which a source device providing content is set by an image display apparatus according to an embodiment of the disclosure. FIG. 10 is a diagram illustrating an example in which an input mode is changed by an image display apparatus according to an embodiment of the disclosure.

FIGS. 8 to 10 illustrate an example in which, when a source device 300 supports the CEC function, an image display apparatus 100 automatically identifies the source device 300, stores source information about the source device 300, and changes an input mode to the source device 300.

FIGS. 8 to 10 illustrates an example in which an image processing device 200 (e.g., an AV receiver 201) is connected to a second HDMI input port of the image display apparatus 100 and the source device 300 (e.g., a BD player 301) is connected to a first HDMI input port of the image processing device 200 as illustrated in FIG. 8. In this case, physical address information of the source device 301 may be expressed as <2.1.0.0>. FIGS. 8 to 10 also illustrate an example in which the source device 300 may support the CEC function.

In operation S901 of FIG. 9, the image display apparatus 100 may start a source device identification process.

In one embodiment of the disclosure, the image display apparatus 100 may be connected to the image processing device 200 through an HDMI cable. The image processing device 200 may be connected to the source device 300 through an HDMI cable.

The image display apparatus 100 may automatically start a process for identifying source information (e.g., a manufacturer's name, device name, and physical address information) of the source device 300.

For example, when the power supply of the image display apparatus 100 is switched from the 'off' state to the 'on' state, the image display apparatus 100 may detect either connection of a device to an HMDI connection port thereof or hot plug and thus start a process for identifying source information (e.g., a manufacturer, device name, and physical address information) of the source device 300.

In operation S902 of FIG. 7, the image display apparatus 100 may transmit a request message, e.g., a "<Give Physical Address>" message, to the source device 300. The "<Give Physical Address>" message is a transmission/reception message pre-arranged between devices supporting the CEC function and may be a message requesting physical address information.

In step S903, the image display apparatus 100 may receive a response message, for example, a "<Report Physical Address>" message, from the source device 300. The "<Report Physical Address>" message is a transmission/reception message pre-arranged between devices supporting the CEC function and may be a message that delivers the physical address information (e.g., <2.1.0.0>).

In one embodiment of the disclosure, the image display apparatus 100 may extract the physical address information from the received response message, and store the extracted physical address information (e.g., <2.1.0.0>) as source information. Accordingly, the image display apparatus 100 may identify that the source device 300 is connected to a first HMDI connection port of the image processing device 200 connected to a second HDMI connection port of the image display apparatus 100.

In operation S904 of FIG. 9, the image display apparatus 100 may transmit a request message, e.g., a "<Give OSD Name>" message, to the source device 300. The "<Give OSD Name>" message is a transmission/reception message pre-arranged between devices supporting the CEC function and may be a message and may be a message requesting device name.

In one embodiment of the disclosure, device identification information of the source device 300 may include device name, a manufacturer's name, model name, and the like. The image display apparatus 100 may transmit a request message requesting the device identification information to the source device 300.

In operation S905, the image display apparatus 100 may receive a response message, e.g., a "<Set OSD Name>" message, from the source device 300. The "<Set OSD Name>" message is a transmission/reception message pre-arranged between devices supporting the CEC function and may be a message that delivers device name (e.g., "BD player").

In one embodiment of the disclosure, the image display apparatus 100 may extract the device name from the received response message and store the extracted device name (e.g., "BD player") as source information. The image display apparatus 100 may store the device name (e.g., "BD player") to correspond to the physical address information (e.g., <2.1.0.0>) stored in operation S903.

In operation S906 of FIG. 9, the image display apparatus 100 may store source information.

In one embodiment of the disclosure, the image display apparatus 100 may store, as source information, the physical address information (e.g., <2.1.0.0>) of the source device 300 received in operation S903 and the device name (e.g., "BD player") received in operation S905 to correspond to each other.

For example, the image display apparatus 100 may store, as, for example, "BD player", device name of the source device 300 connected to the first HMDI connection port of the image processing device 200 connected to the second HDMI connection port of the image display apparatus 100.

In one embodiment of the disclosure, the image display apparatus 100 may create a table including source information about a plurality of source devices 300. The table about the source information may include physical address information of each of the plurality of source devices 300 and device identification information (e.g., device type, device name, and a manufacturer's name) corresponding to the physical address information.

In one embodiment of the disclosure, the image display apparatus 100 may compare received device identification information (e.g., device name and/or a manufacturer's name) with device identification information included in a table pre-stored in the memory 120 of FIG. 3, and store the received identification information as source information when it is determined that the received device identification information is not the same as the device identification information included in the table.

FIG. 10 is a diagram illustrating an example in which input mode changing is performed by an image display apparatus according to an embodiment of the disclosure.

In operation S1001 of FIG. 10, an image display apparatus 100 may display a user interface including device identification information.

In one embodiment of the disclosure, the image display apparatus 100 may display the device identification information (e.g., device name) included in the table about the source information, which is stored in the memory 120 of FIGS. 2 and 3 (hereinafter referred to as the memory 120), on the display 110 of FIG. 3 (hereinafter referred to as the display 110).

For example, when a user input signal requesting external input source information is received, the image display apparatus 100 may display a user interface including device identification information (e.g., device type, device name, and a manufacturer's name), thereby providing source information. The device identification information about the source device included in the user interface may include a device type (e.g., "BD player") of the source device and a manufacturer's name (e.g., company A") of the source device.

Alternatively, for example, the device identification information about the source device included in the user interface may be information (e.g., "DD-ss") that is a combination of a model name (e.g., "DD") of the image processing device 200 and a model name (e.g., "ss") of the source device 300 but is not limited thereto.

In operation S1002 of FIG. 10, the image display apparatus 100 may receive an input signal for selecting a device.

In one embodiment of the disclosure, the image display apparatus 100 may receive an input signal for selecting a source device, based on the device identification information (e.g., device name) included in the user interface.

In one embodiment of the disclosure, the image display apparatus 100 may identify a user input signal for selecting a source device as a control signal instructing to change an input mode to a selected source device.

In operation S1003 of FIG. 10, the image display apparatus 100 may transmit a "<Set Stream Path>" message.

In one embodiment of the disclosure, the image display apparatus 100 may transmit a message instructing an input mode change to the source device 300, based on the physical address information stored to correspond to the device identification information selected in operation S1002. For example, the image display apparatus 100 may broadcast the "<Set Stream Path>" message.

In one embodiment of the disclosure, the "<Set Stream Path>" message is a transmission/reception message pre-arranged between devices supporting the CEC function and may be a message informing about an input mode to be changed to. The image display apparatus 100 may broadcast the "<Set Stream Path>" message after including therein the physical address information (e.g., <2.1.0.0>) of the source device 300 to be changed to an input mode.

The "<Set Stream Path>" message including the physical address information (e.g., <2.1.0.0>) may be a message informing a user that the source device 300 connected to the first HMDI connection port of the image display apparatus 200 connected to the second HDMI connection port of the image display apparatus 100 is to be changed to an input mode to receive content therefrom.

In operation S1004 of FIG. 10, the image display apparatus 100 may be changed to an HDMI input mode.

In one embodiment of the disclosure, the image display apparatus 100 may change an input mode, based on the physical address information stored to correspond to the device identification information selected in operation S1002.

In one embodiment of the disclosure, the image display apparatus 100 may change an input mode to the second HDMI input port of the image display apparatus 100, based on first byte information (e.g., "2" in <2.1.0.0>) of the physical address information (e.g., <2.1.0.0>) corresponding to the selected device identification information (e.g., "DD-ss").

In operation S1005, the image processing device 200 may be changed to an HDMI input mode.

In one embodiment of the disclosure, the image processing device 200 may receive the <Set Stream Path> message broadcast in operation S1003, and change an input mode to the first HDMI input port of the image processing device 200, based on second byte information (e.g., "1" in <2.1.0.0>) of the physical address information (e.g., <2.1.0.0>) included in the <Set Stream Path> message.

In operation S1006, the image display apparatus 100 may receive an <Active Source> message from the source device 300.

In one embodiment of the disclosure, the source device 300 may broadcast an "<Active Source>" message including the physical address (e.g., <2.1.0.0>) thereof as a response message to the <Set Stream Path> message, when it is determined that the physical address (e.g., <2.1.0.0>) included in the broadcast "<Set Stream Path>" message matches the physical address of the source device 300.

In one embodiment of the disclosure, the "<Active Source>" message is a transmission/reception message prearranged between devices supporting the CEC function and may be a message informing that the source device 300 that has transmitted this message will operate as a source device that will provide content to the image display apparatus 100.

In operation S1007, the image display apparatus 100 may transmit a CEC key for control of the source device 300.

In one embodiment of the disclosure, when receiving the "<Active Source>" message, the image display apparatus 100 may control the source device 300 through one integrated control device, e.g., the control device 400 of FIG. 1, based on the CEC message.

In one embodiment of the disclosure, the image display apparatus 100 may automatically store information (e.g., physical address information, manufacturer's name, device name, etc.) about the source device 300 as a piece of source information of the image display apparatus 100 without a user input.

In addition, a user interface including device identification information may be provided, so that the image display apparatus 100 may easily change to an input mode that a user desires according to a user input to select device identification information such as a device name.

FIGS. 8 to 10 are provided to describe one embodiment of the disclosure and thus the disclosure is not limited thereto.

Figure 11:
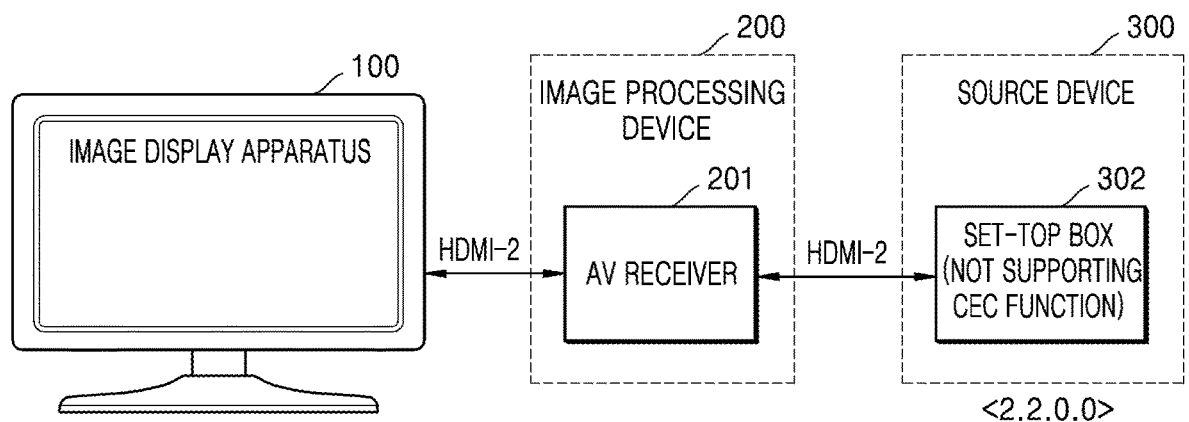
FIG. 11 is a diagram for explaining an example of connecting a system according to an embodiment of the disclosure.
Figure 12:
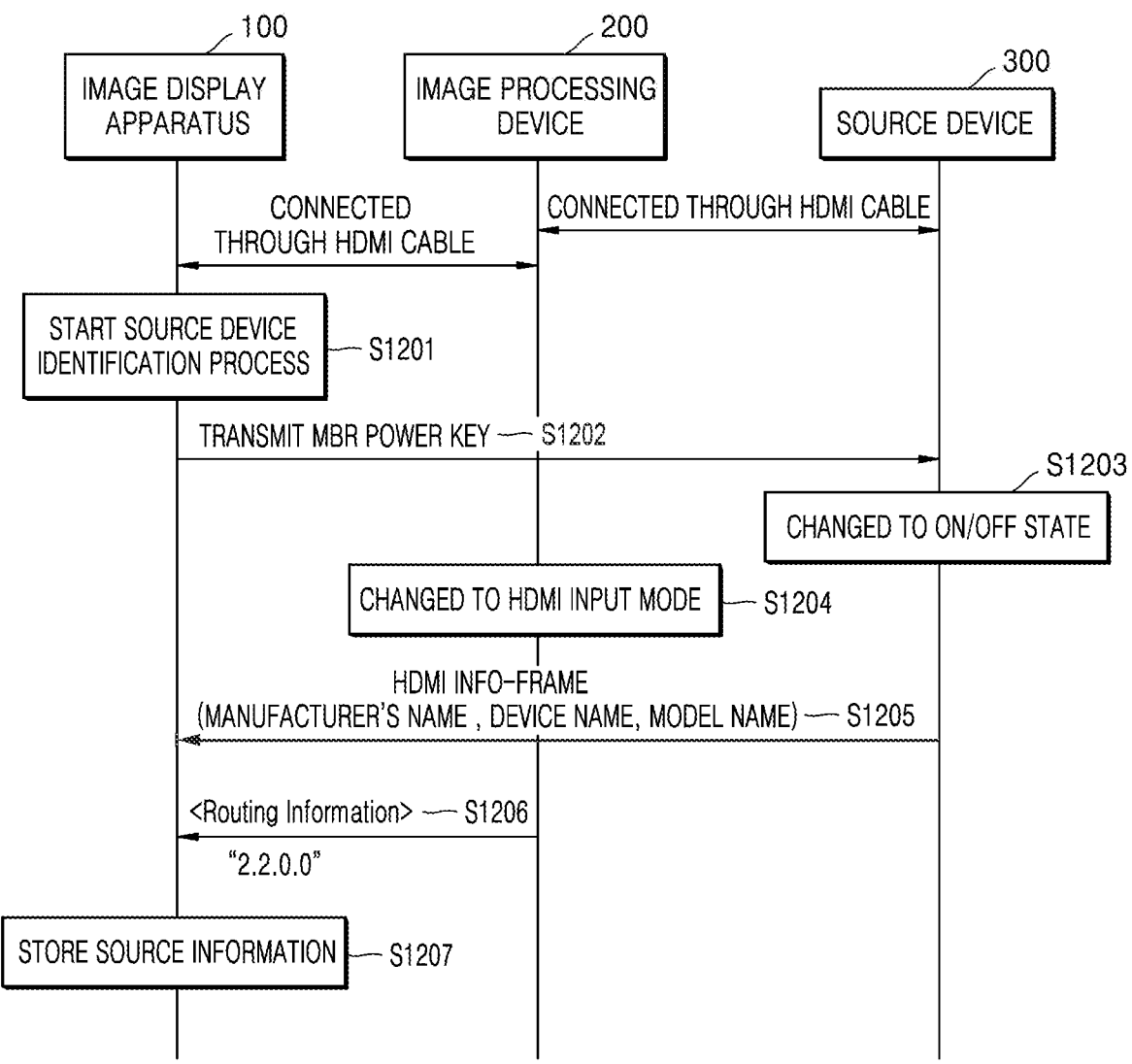
FIG. 12 is a flowchart illustrating an example in which a source device providing content is set by an image display apparatus according to another embodiment of the disclosure.
Figure 13:
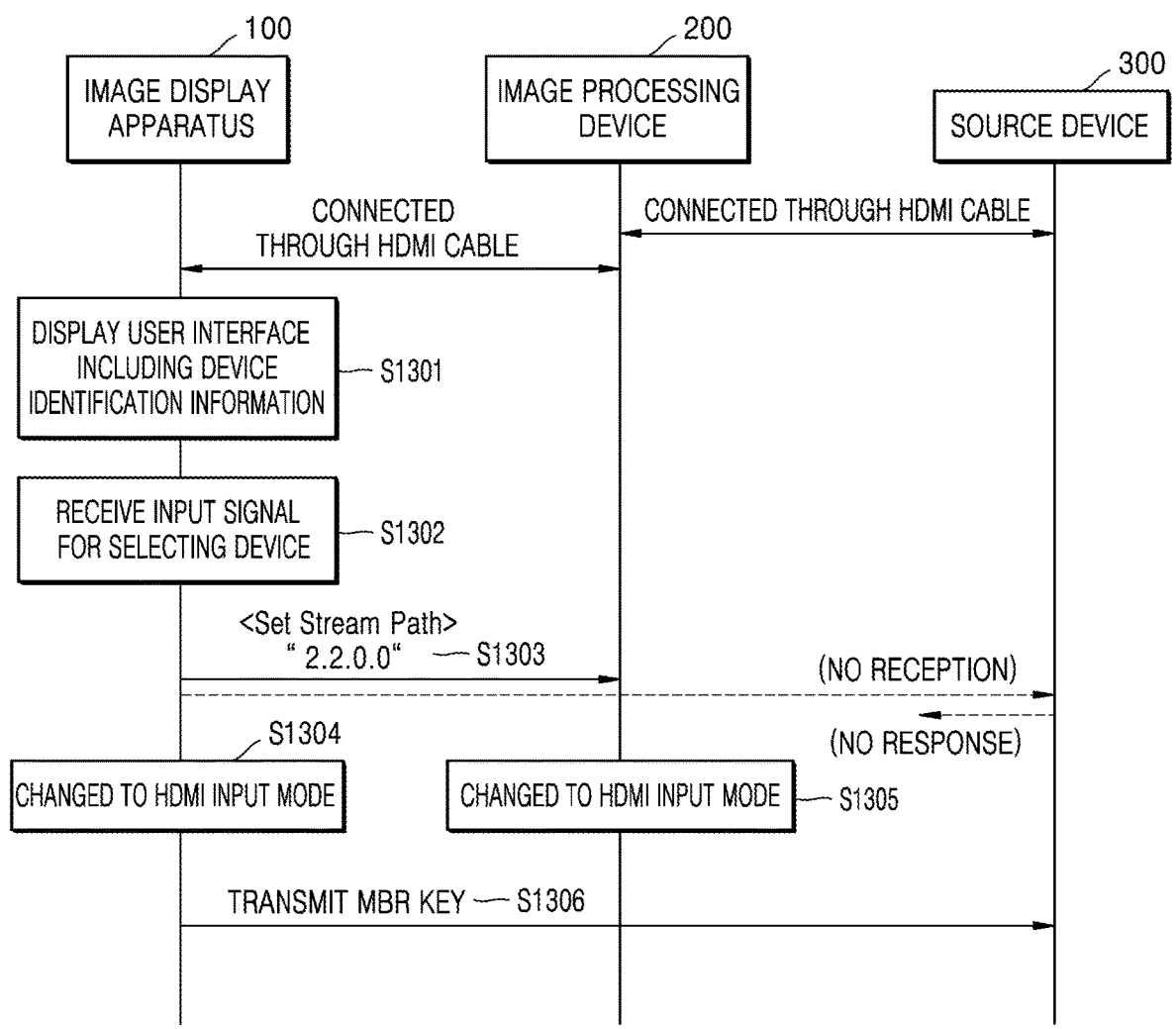
FIG. 13 is a flowchart illustrating an example in which an input mode is changed by an image display apparatus according to another embodiment of the disclosure.

FIG. 11 is a diagram for explaining an example of connecting a system according to an embodiment of the disclosure. FIG. 12 is a flowchart illustrating an example of setting a content providing device by an image display apparatus according to another embodiment of the disclosure. FIG. 13 is a flowchart illustrating an example in which an input mode is changed by an image display apparatus according to another embodiment of the disclosure.

FIGS. 11 to 13 illustrates an example in which, when a source device 300 does not support the CEC function, the MBR function is used for an image display apparatus 100 to automatically identify the source device 300, store source information of the source device 300, and change an input mode.

FIGS. 11 to 13 illustrates an example in which an image processing device 200 (e.g., an AV receiver 201) is connected to a second HDMI input port of the image display apparatus 100 and the source device 300 (e.g., a set-top box 302) is connected to a second HDMI input port of the image processing device 200 as illustrated in FIG. 11. In this case, physical address information of the source device 300 may be expressed as <2.2.0.0>.

In operation S1201 of FIG. 12, the image display apparatus 100 may start a source device identification process.

In one embodiment of the disclosure, the image display apparatus 100 may automatically start a process for identifying source information (e.g., a manufacturer's name, device name, and physical address information) of the source device 300.

For example, when the power supply of the image display apparatus 100 is switched from the 'off' state to the 'on' state, the image display apparatus 100 may detect either connection of a device to an HMDI connection port thereof or hot plug and thus start a process for identifying source information (e.g., a manufacturer, device name, and physical address information) of the source device 300.

In operation S1202 of FIG. 12, the image display apparatus 100 may transmit a control signal, for example, an MBR power key.

In one embodiment of the disclosure, the image display apparatus 100 may transmit a control signal (e.g., a power key) included in at least one remote control code set among a plurality of remote control code sets stored in the memory 120 and each including a control signal for control of an operation of an external device.

In one embodiment of the disclosure, the memory 120 of FIGS. 2 and 3) (hereinafter, the memory 120) may store a plurality of remote control code sets each including a control signal for control of an operation of an external device.

In one embodiment of the disclosure, the image display apparatus 100 may arbitrarily select a code set to be transmitted from among the plurality of remote control code sets stored in the memory 120. In one embodiment of the disclosure, the image display apparatus 100 may transmit a control signal included in a remote control code set corresponding to a device that does not support the CEC function.

In operation S1203 of FIG. 12, the source device 300 may switch to an "on" state or an "off" state, based on the control signal.

In one embodiment of the disclosure, the source device 300 may be switched to the "on" state or the "off" state in response to the control signal when the control signal (e.g., the power key) transmitted by the image display apparatus 100 corresponds to a remote control code set thereof.

In operation S1204 of FIG. 12, the image processing device 200 may be changed to an HDMI input mode.

In one embodiment of the disclosure, the image processing device 200 may detect an HDMI input port of the image processing device 200 to which the source device 300 powered on or off based on the control signal (e.g., the power key) is connected. The image processing device 200 detecting this HDMI input port may change to an input mode to the detected HDMI input port.

For example, when the image processing device 200 detects that the source device 300 connected to a second HDMI input port of the image processing device 200 is switched to the "on" state, the image processing device 200 may change the input mode to the second HDMI input port.

In operation S1205 of FIG. 12, the image display apparatus 100 may receive HDMI info-frame information.

In one embodiment of the disclosure, the HDMI info-frame information may include device identification information including a manufacturer's name, a device name, and a model name of the source device 300.

In one embodiment of the disclosure, the image display apparatus 100 may receive the HDMI info-frame information of the source device 300 responding to the control signal (e.g., the power key) transmitted by the image display apparatus 100 through a display data channel (DDC) line.

In operation S1206 of FIG. 12, the image display apparatus 100 may receive physical address information of the source device 300 from the image processing device 200.

In one embodiment of the disclosure, the image processing device 200 may identify the physical address information (e.g., <2.2.0.0>) of the source device 300 by detecting an HDMI input port (e.g., a second HDMI input port) of the image processing device 200 to which the source device 300 switched to the "on" or "off" state is connected.

In one embodiment of the disclosure, the image processing device 200 may broadcast a "<Routing Information>" message, which is a CEC message including physical address information, to transmit the physical address information (e.g., <2.2.0.0>) of the source device 300 to the image display apparatus 100.

For example, when the image processing device 200 connected to the second HDMI input port of the image display apparatus 100 detects that the source device 300 connected to the second HDMI input port 2 of the image processing device 200 is 'on', the image processing device 200 may broadcast the physical address information (e.g., <2.2.0.0>) of the source device 300 to the image display apparatus 100.

In operation S1207 of FIG. 12, the image display apparatus 100 may store source information.

In one embodiment of the disclosure, the image display apparatus 100 may map the physical address information and the device identification information of the source device 300 to each other to be stored as external input source information.

In one embodiment of the disclosure, the image display apparatus 100 may create and store a table including a plurality of pieces of external input source information.

In one embodiment of the disclosure, the image display apparatus 100 may map the device identification information (e.g., a manufacturer's name, a device name, and a model name) of the source device 300 included in the HDMI info-frame obtained in operation S1205 and the physical address information (e.g., <2.2.0.0>) of the source device 300 obtained in operation S1206 to each other to be stored as source information.

In one embodiment of the disclosure, the image display apparatus 100 may compare received device identification information (e.g., a device name and/or a manufacturer's name) with device identification information about source information included in a table pre-stored in the memory 120 of FIG. 3, and store the received identification information as source information when it is determined that the received device identification information is not the same as the device identification information included in the table.

FIG. 13 is a flowchart illustrating an example in which input mode changing is performed by an image display apparatus according to another embodiment of the disclosure.

In operation S1001 of FIG. 13, an image display apparatus 100 may display a user interface including device identification information.

In one embodiment of the disclosure, the image display apparatus 100 may display the device identification information (e.g., a device name) included in a table about source information, which is stored in the memory 120 of FIGS. 2 and 3 (hereinafter referred to as the memory 120), on the display 110 of FIG. 3 (hereinafter referred to as the display 110).

For example, when a user input signal requesting external input source information is received, the image display apparatus 100 may display a user interface including device identification information (e.g., a manufacturer's name "company A"), thereby providing source information.

Alternatively, for example, the device identification information about the source device included in the user interface may be information (e.g., "DD-kk") that is a combination of a model name (e.g., "DD") of the image processing device 200 and a model name (e.g., "kk") of the source device 300 but is not limited thereto.

In operation S1302 of FIG. 10, the image display apparatus 100 may receive an input signal for selecting a device.

In one embodiment of the disclosure, the image display apparatus 100 may receive an input signal for selecting a source device, based on the device identification information included in the user interface.

In one embodiment of the disclosure, the image display apparatus 100 may identify the input signal, for selecting a source device (e.g., "DD-kk") displayed on a user interface, as a control signal instructing to change an input mode to the selected source device.

In operation S1303 of FIG. 10, the image display apparatus 100 may transmit a "<Set Stream Path>" message.

In one embodiment of the disclosure, the image display apparatus 100 may transmit a message for an input mode change, based on physical address information (e.g., <2.2.0.0>) stored to correspond to the device identification information (e.g., "DD-kk") selected in operation S1302. For example, the image display apparatus 100 may broadcast the "<Set Stream Path>" message.

In one embodiment of the disclosure, the "<Set Stream Path>" message is a transmission/reception message prearranged between devices supporting the CEC function and may be a message informing about an input mode to be changed to. For example, the image display apparatus 100 may broadcast the "<Set Stream Path>" message after including therein the physical address information (e.g., <2.2.0.0>) of the source device 300 to be changed to an input mode.

For example, the "<Set Stream Path>" message including the physical address information (e.g., <2.2.0.0>) may be a message informing that the source device 300 connected to the second HMDI connection port of the image display apparatus 200 connected to the second HDMI connection port of the image display apparatus 100 is to be changed to an input mode to receive content therefrom.

In operation S1304, the image display apparatus 100 may be changed to an HDMI input mode.

In one embodiment of the disclosure, the image display apparatus 100 may change an input mode change, based on the physical address information (e.g., <2.2.0.0>) stored to correspond to the device identification information (e.g., "DD-kk") selected in operation S1302.

In one embodiment of the disclosure, the image display apparatus 100 may change the input mode to the second HDMI input port of the image display apparatus 100, based on first byte information of the physical address (e.g., "2" in <2.2.0.0>).

In operation S1305 of FIG. 12, the image processing device 200 may be changed to an HDMI input mode.

In one embodiment of the disclosure, the image processing device 200 supporting the CEC function may receive a "<Set Stream Path>" message which is a CEC message broadcast in operation S1303, and change an input mode to the second HDMI input mode of the image processing device 200, based on second byte information (e.g., "2" in <2.2.0.0>) of the physical address (e.g., <2.2.0.0>) included in the "<Set Stream Path>" message.

The source device 300 of FIG. 13 is an example of a device that does not support the CEC function and thus is not capable of identifying the "<Set Stream Path>" message which is a CEC message broadcast in operation S1303. Therefore, the source device 300 does not respond.

In operation S1306, the image display apparatus 100 may transmit an MBR key for control of the source device 300.

In one embodiment of the disclosure, the image display apparatus 100 may determine a remote control code set for control of the source device 300, based on an HDMI info-frame (see S1205 of FIG. 12) obtained in the source device identification process. The image display apparatus 100 may control the source device 300 by using the determined remote control code set.

In one embodiment of the disclosure, the image display apparatus 100 may automatically identify the source device 300, which does not support the CEC function, without receiving a user input, and store information about the source device 300 as a piece of source information of the image display apparatus 100. In addition, an input mode that a user desires may be easily changed to according to a user input instructing to select device identification information, such as a device name, displayed on a user interface.

FIGS. 11 to 13 are provided to describe one embodiment of the disclosure and the disclosure is not limited thereto.

The above-described embodiments of the disclosure may be embodied as a computer executable program and implemented in a general-purpose digital computer for execution of the program by using a computer-readable recording medium. The data structures used in the above-described embodiments of the disclosure may be recorded on a computer-readable recording medium through various means. Furthermore, the above-described embodiments of the disclosure may be implemented in the form of a recording medium storing instructions executable by a computer such as program modules executable by a computer. For example, methods implemented by a software module or algorithm may be stored in a computer-readable medium in the form of codes or program instructions readable and executable by a computer.

The computer-readable medium may be any recording medium accessible by a computer and may include a volatile storage medium, a non-volatile storage medium, a removable storage medium, and a non-removable storage medium. The computer-readable medium may include, but is not limited to, a magnetic storage medium, such as a ROM, a floppy disk, a hard disk, or the like) and an optical storage medium such as a CD-ROM, a DVD, or the like. Alternatively, the computer-readable medium may include a computer storage medium and a communication medium.

A plurality of computer-readable recording media may be distributed over network coupled computer systems, and data, e.g., program instructions and code, stored in the distributed computer-recording media may be executed by at least one computer.

The embodiments of the disclosure described herein are only examples and thus the scope of the disclosure is not limited thereby in any way. For brevity of the specification, a description of existing electronic configurations, control systems, software, and other functional aspects of the systems may be omitted.

The above description of the disclosure is intended to provide examples and it will be understood by those of ordinary skill in the art to which the disclosure pertains that various modifications may be made without changing the technical spirit or essential features of the disclosure. Therefore, it should be understood that the embodiments of the disclosure described above are merely examples in all respects and not restrictive. For example, each component described as a single type may be implemented in a distributed manner, and similarly, components described as distributed may be implemented in a combined form.

All the examples or example terms herein are for the purpose of describing the disclosure in detail and thus the scope of the disclosure is not limited thereby unless they are defined in the claims.

In addition, unless specified using expressions such as "essential" and "importantly", the components described herein may not be indispensable components to the implementation of the disclosure.

It will be understood by those of ordinary skill in the art that embodiments of the disclosure may be embodied in many different forms without departing from essential features of the disclosure.

Because the disclosure may be embodied in many different forms and implemented in various embodiments of the disclosure, it should be understood that the disclosure is not limited by the embodiments of the disclosure described herein and all modifications, equivalents, and alternatives falling within the spirit and scope of the disclosure are included in the disclosure. Therefore, the embodiments of the disclosure set forth herein should be considered in a descriptive sense only and not for purposes of limitation.

The scope of the disclosure should be defined by the following claims rather than the detailed description, and all changes or modifications derivable from the defined matters and scope of the claims and their equivalents should be construed as being included in the scope of the disclosure.

Terms such as "unit", "module," and the like, when used herein, represent units for processing at least one function or operation, which may be implemented by hardware, software, or a combination of hardware and software.

"Units" and "modules" may be stored in an addressable storage medium and implemented by a program executable by a processor.

For example, "units" and "modules" may be implemented by components, such as software components, object-oriented software components, class components, and task components, processes, functions, attributes, procedures, subroutines, segments of program code, drivers, firmware, microcode, a circuit, data, database, data structures, tables, arrays, and parameters.

As used herein, a description "A may include one of a1, a2, and a3" should be broadly understood to mean that an example element that may be included in the element A is a1, a2, or a3.

It should not be understood from the above description that elements that may constitute the element A are limited to a1, a2, or a3. Therefore, it should not be understood that elements constituting the element A exclude other elements not mentioned herein, i.e., the above description should not be interpreted exclusively.

The above description may be understood to means that A may include a1, a2, or a3. The above description should not be understood that elements constituting the element A are necessarily selectively determined within a certain set. For example, the above description should not be understood in a restrictive manner that a1, a2, or a3 selected from a set consisting of a1, a2, and a3 constitutes a component A.

As used herein, an expression "at least one of a1, a2, and a3" refers to "a1", "a2", "a3", "a1 and a2", "a1 and a3", "a2 and a3", or "a1, a2, and a3". Thus, unless explicitly stated as "at least one of a1", "at least one of a2" or "at least one of a3", the expression "at least one of a1, a2 and a3" should not be understood to mean "at least one of a1", "at least one of a2", or "at least one of a3".

What is claimed is:

1. An image display apparatus connected to an image processing device via a first port of the image display apparatus, the image display apparatus comprising:
    a memory storing one or more instructions; and
    a processor configured to execute the one or more instructions stored in the memory to control the image display apparatus to:
        create a table including physical address information of each of at least one source device connected to a second port of the image processing device and device identification information corresponding to the physical address information;
        display a user interface including the device identification information included in the table;
        in response to a user input selecting a user interface item representing a first source device among the at least one source device, based on the device identification information included in the displayed user interface, transmit, to the first source device, a request message requesting an input mode change, the request message including first physical address information of the first source device;
        receive, from the first source device, a response message identifying the input mode change, the response message including the first physical address information; and
        in response to the response message being received, change an input mode of the image display apparatus to the first source device.

2. The image display apparatus of claim 1, wherein the processor is further configured to execute the one or more instructions to control the image display apparatus to control the first source device using a remote control code set corresponding to the device identification information of the first source device.

3. The image display apparatus of claim 1, wherein the physical address information of each of the at least one source device comprises first high-definition multimedia interface (HDMI) connection port information of the image display apparatus with respect to the image processing device and second HDMI connection port information of the image processing device with respect to the source device, the first HDMI connection port information corresponding to the first port, and the second HDMI connection port information corresponding to the second port.

4. The image display apparatus of claim 1, wherein the processor is further configured to execute the one or more instructions to control the image display apparatus to:
    transmit, to each of the at least one source device, a request message requesting physical address information of each of the at least one source device;
    receive, from each of the at least one source device, a response message including the physical address information of the corresponding source device, the response message being transmitted in response to the request message; and
    create the table including the physical address information included in the response message from each of the at least one source device.

5. The image display apparatus of claim 1, wherein the processor is further configured to execute the one or more instructions to control the image display apparatus to:
    transmit, to each of the at least one source device, a request message requesting device identification information of each of the at least one source device;
    receive, from each of the at least one source device, a response message including the device identification information of the corresponding source device, the response message being transmitted in response to the request message; and
    create the table such that the device identification information included in the received response message from each of the at least one source device corresponds to the physical address information of each of the at least one source device.

6. The image display apparatus of claim 1, wherein the processor is further configured to execute the one or more instructions to control the image display apparatus to:
    transmit a control signal included in a remote control code set stored in the memory;
    receive physical address information of a source device responding to the control signal from the image processing device, the physical address information being verified by the image processing device; and
    create the table including the received physical address information.

7. The image display apparatus of claim 6, wherein the processor is further configured to execute the one or more instructions to control the image display apparatus to:
    receive device identification information from the source device responding to the control signal; and
    create the table such that the received device identification information corresponds to the physical address information of the source device responding to the control signal.

8. The image display apparatus of claim 6, wherein the processor is further configured to execute the one or more instructions to control the image display apparatus to receive the physical address information of the source device from the image processing device changed to an input mode of the source device responding to the control signal.

9. An operating method of an image display apparatus connected to an image processing device via a first port of the image display apparatus, the image processing device connected to at least one source device via a second port of the image processing device, the operating method comprising:
- creating, by a processor of the image display apparatus, a table including physical address information of each of the at least one source device and device identification information corresponding to the physical address information;
- displaying, by the processor, a user interface (UI) including the device identification information included in the table;
- in response to a user input selecting a user interface item representing a first source device among the at least one source device, based on the device identification information included in the displayed user interface, transmitting, to the first source device, a request message requesting an input mode change, the request message including first physical address information of the first source device;
- receiving a response message from the first source device, the response message identifying the input mode change, and the response message including the first physical address information; and
- in response to the response message being received, changing, by the processor, an input mode of the image display apparatus to the first source device.

10. The operating method of claim 9, further comprising controlling the first source device using a remote control code set corresponding to the device identification information of the first source device.

11. The operating method of claim 9, further comprising:
- transmitting, to the at least one source device, a request message requesting physical address information of the at least one source device;
- receiving, from a source device responding to the request message, a response message including physical address information of the source device responding to the request message; and
- creating the table including the physical address information included in the response message.

12. The operating method of claim 9, further comprising:
- transmitting, to the at least one source device, a request message requesting device identification information of the at least one source device;
- receiving, from a source device responding to the request message, a response message including device identification information of the source device responding to the request message; and
- creating the table such that the device identification information included in the received response message corresponds to the physical address information of the source device responding to the request message.

13. A non-transitory computer-readable recording medium storing a program which, when executed by a processor of an image display apparatus connected to an image processing device via a first port of the image display apparatus, the image processing device connected to at least one source device via a second port of the image processing device, causes the image display apparatus to:
- create, by a processor of the image display apparatus, a table including physical address information of each of the at least one source device and device identification information corresponding to the physical address information;
- display, by the processor, a user interface (UI) including the device identification information included in the table;
- in response to a user input selecting a user interface item representing a first source device among the at least one source device, based on the device identification information included in the displayed user interface, transmit, to the first source device, a request message requesting an input mode change, the request message including first physical address information of the first source device based on the table;
- receive a response message from the first source device, the response message identifying the input mode change and the response message including the first physical address information; and
- in response to the response message being received, change, by the processor, an input mode of the image display apparatus to the first source device.

* * * * *